United States Patent
Yamada et al.

(10) Patent No.: US 10,036,945 B2
(45) Date of Patent: Jul. 31, 2018

(54) LIGHT EMISSION CONTROL CIRCUIT, LIGHT SOURCE APPARATUS, AND PROJECTION-TYPE VIDEO DISPLAY DEVICE

(71) Applicant: SEIKO EPSON CORPORATION, Tokyo (JP)

(72) Inventors: Atsushi Yamada, Nagoya (JP); Norikazu Tsukahara, Minamiminowa-mura (JP); Kei Ishimaru, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/840,385

(22) Filed: Dec. 13, 2017

(65) Prior Publication Data

US 2018/0180978 A1   Jun. 28, 2018

(30) Foreign Application Priority Data

Dec. 26, 2016  (JP) ................................ 2016-250627
Oct. 5, 2017   (JP) ................................ 2017-194874
Oct. 10, 2017  (JP) ................................ 2017-196626

(51) Int. Cl.
*H05B 41/14* (2006.01)
*G03B 21/20* (2006.01)
(Continued)

(52) U.S. Cl.
CPC ....... *G03B 21/2053* (2013.01); *H04N 9/3155* (2013.01); *H05B 33/0818* (2013.01);
(Continued)

(58) Field of Classification Search
CPC ............ H05B 33/0803; H05B 33/0827; H05B 33/0809; H05B 33/0821; H05B 41/34;
(Continued)

(56) References Cited

U.S. PATENT DOCUMENTS 6,577,072 B2   6/2003   Saito et al.
6,844,760 B2   1/2005   Koharagi et al.
(Continued)

FOREIGN PATENT DOCUMENTS

JP   4017960 B2    12/2007
JP   2009-200053 A  9/2009
JP   2015-135738 A  7/2015

*Primary Examiner* — Minh D A
(74) *Attorney, Agent, or Firm* — Oliff PLC

(57) ABSTRACT

This light emission control circuit controls a first switching element for controlling a current that flows to a light-emitting element connected between a first node and one end of an inductor, and a second switching element for controlling a current that flows from the other end of the inductor to a second node. The light emission control circuit has a driving circuit that generates a first control signal for controlling the first switching element, and a switching control circuit that generate a second control signal for controlling the second switching element, and deactivates the second control signal in order to bring the second switching element into an off-state, during a period during which the first switching element is in an off-state.

13 Claims, 14 Drawing Sheets

(51) Int. Cl.
*H05B 33/08* (2006.01)
*H05B 37/02* (2006.01)
*H04N 9/31* (2006.01)

(52) U.S. Cl.
CPC ..... *H05B 33/0851* (2013.01); *H05B 37/0227* (2013.01); *G03B 21/2033* (2013.01)

(58) Field of Classification Search
CPC ...... H05B 39/09; H05B 41/28; H05B 41/295; H05B 41/2827; H05B 41/3925; H05B 33/0815; H05B 33/0818; H05B 41/2828; H05B 41/3921; H05B 41/3927; F21Y 2101/02; Y02B 20/202
See application file for complete search history.

(56) References Cited

U.S. PATENT DOCUMENTS

| | | | | |
|---|---|---|---|---|
| 8,253,583 | B2* | 8/2012 | Krippendorf | G08B 5/36 331/108 R |
| 2011/0285312 | A1* | 11/2011 | Choutov | H05B 33/0815 315/291 |

\* cited by examiner

LIGHT EMISSION CONTROL CIRCUIT, LIGHT SOURCE APPARATUS, AND PROJECTION-TYPE VIDEO DISPLAY DEVICE

1. TECHNICAL FIELD

The invention relates to a light emission control circuit that controls light emission in a light source apparatus in which a light-emitting element such as a laser diode, a light emitting diode, or the like is used. The invention further relates to a light source apparatus that uses such a light emission control circuit and a projection-type video display device that uses such a light source apparatus.

2. RELATED ART

As techniques for adjusting brightness in a light source apparatus that uses a light-emitting element such as a laser diode (LD), a light emitting diode (LED), or the like, analog light control and digital light control are known. For example, analog light control is realized by controlling a switching regulator for driving a light-emitting element so as to adjust the magnitude of a current that flows to the light-emitting element. On the other hand, digital light control is realized by controlling on/off of a switching transistor connected to a light-emitting element in series so as to adjust the length of a period during which a current flows to the light-emitting element.

As a related technique, Patent Literature 1 discloses a light source driving apparatus that can cause the relationship between the magnitude of a light control instruction signal and an output current to be linear over a broader light control region in order to improve the light control property of the light source in which the relationship between a light control instruction and the degree of light control is different significantly between a relatively bright light control region and a dark light control region.

As shown in FIG. 2 of JP-A-2015-135738, in this light source driving apparatus, analog light control is used in which a converter circuit unit 3 that includes an inductor L1 and a switch element Q1 connected to an LED module 12 in series is controlled so as to adjust the magnitude of an output current Io that is supplied from the converter circuit unit 3 to the LED module 12.

In addition, JP-A-2009-200053 discloses a power supply apparatus that aims to improve the power efficiency in an LED lamp apparatus. As shown in FIG. 3 of JP-A-2009-200053, in this power supply apparatus, digital light control is used in which on/off of a switching element 316 connected to an LED lamp 106 in series is controlled at a predetermined frequency so as to adjust the length of a period during which a current flows to the LED lamp 106.

In a case where both analog light control and digital light control are performed in a single light source apparatus, when the circuit for analog light control disclosed in JP-A-2015-135738 and a circuit for digital light control disclosed in JP-A-2009-200053 are combined, those circuits will operate individually and independently. Therefore, even after a first switching element for digital light control (the switching element 316 of JP-A-2009-200053) transits from an on-state to an off-state, a second switching element for analog light control (the switch element Q1 of JP-A-2015-135738) performs an on-off operation in some cases.

During a period during which the first switching element is in an off-state, a current does not flow to a light-emitting element, but when the second switching element enters an on-state, a current flows from an inductor (the inductor L1 of Patent Literature 1) to a negative electrode terminal of a DC power supply via the second switching element. Therefore, energy accumulated in the inductor is discharged without being used for light emission in the light-emitting element. As a result, there is a defect, or specifically, occurrence of wasteful power loss in a projection-type video display device that uses such a light source apparatus.

On the other hand, it is conceivable that the second switching element is maintained in an off-state during the period during which the first switching element is in an off-state, but in that case, there is a risk that an on-period of the second switching element is shorter than an on-period that is essentially necessary. This becomes a problem in a case where an on-period of the first switching element is shorter than the on-period of the second switching element that is essentially necessary (for example, in a case where the on-duty ratio of the first switching element is smaller than 5%).

In such a case, sufficient energy is not accumulated in the inductor, and the energy accumulated in the inductor gradually decreases during an off-period of the second switching element, and thus a current that flows to the light-emitting element decreases below a current instructed in analog light control, and brightness of the light-emitting element becomes insufficient.

Particularly if a laser diode is used as the light-emitting element, there is a risk that the laser diode does not emit light since a current that flows to the laser diode does not reach the critical current of laser oscillation. There is also a risk that the luminance of an image projected by a projection-type video display device that uses such a light source apparatus becomes insufficient.

SUMMARY

Accordingly, in light of the above-described issues, a first advantage of some aspects of the invention is to provide a light emission control circuit that can suppress discharge of energy accumulated in an inductor without being used for light emission and reduce power loss in a case of performing both analog light control and digital light control. Additionally, a second advantage of some aspects of the invention is to, when performing such light emission control, prevent reduction of a current that flows to a light-emitting element below a current instructed in analog light control even in a case where a period during which a current is caused to flow to the light-emitting element in digital light control is short. Furthermore, a third advantage of some aspects of the invention is to provide a light source apparatus that uses such a light emission control circuit, a projection-type video display device that uses such a light source apparatus, and the like.

In order to solve at least a portion of the aforementioned issues, a light emission control circuit according to a first aspect of the invention controls a first switching element for controlling a current that flows to a light-emitting element connected between a first node and one end of an inductor and a second switching element for controlling a current that flows from the other end of the inductor to a second node. The light emission control circuit includes (i) a driving circuit that generates a first control signal for controlling the first switching element, and (ii) a switching control circuit that generates a second control signal for controlling the second switching element, and deactivates the second control signal in order to bring the second switching element into an off-state during at least a portion of a period during which the first control signal is deactivated by the driving circuit in order to bring the first switching element into an off-state.

According to the first aspect of the invention, in a case of performing both analog light control and digital light control, the second switching element for analog light control is in an off-state during a period during which the first switching element for digital light control is in an off-state and a current does not flow to the light-emitting element. That makes it possible to suppress discharge of energy accumulated in the inductor without being used for light emission, and reduce power loss.

For example, in a case where a P-channel MOS transistor is used as the first or second switching element, the first or second control signal is activated to a low level, and is deactivated to a high level. On the other hand, in a case where an N-channel MOS transistor is used as the first or second switching element, the first or second control signal is activated to a high level, and is deactivated to a low level.

Here, the switching control circuit may maintain the second control signal in a deactivated state during a period during which the first control signal is deactivated if an on-duty ratio of the first control signal is larger than or equal to a predetermined value, and maintain the second control signal in an activated state during a portion of the period during which the first control signal is deactivated if the on-duty ratio of the first control signal is smaller than the predetermined value.

Accordingly, if the on-duty ratio of the first control signal for digital light control is larger than or equal to the predetermined value, the second switching element is maintained in an off-state by maintaining the second control signal for analog light control in a deactivated state during the period during which the first control signal is deactivated. That makes it possible to suppress discharge of energy accumulated in the inductor without being used for light emission, and reduce power loss, in a case of performing both analog light control and digital light control.

In addition, if the on-duty ratio of the first control signal for digital light control is smaller than the predetermined value, the second switching element is maintained in an on-state by maintaining the second control signal for analog light control in an activated state during a portion of the period during which the first control signal is deactivated. That makes it possible to prevent reduction, below a current instructed in analog light control, of a current that flows to the light-emitting element, by accumulating energy in the inductor, even in a case where a period during which a current is caused to flow to the light-emitting element in digital light control is short.

Here, if the on-duty ratio of the first control signal is smaller than the predetermined value, the switching control circuit may maintain the second control signal in an activated state during a predetermined period after the first control signal transits from an activated state to a deactivated state. That makes it possible to continuously increase energy that is accumulated in the inductor by extending a period during which the second switching element is in an on-state by the predetermined period after the first control signal is deactivated.

In addition, if the on-duty ratio of the first control signal is smaller than the predetermined value, and the second control signal has never been deactivated during a period during which the first control signal is activated, the switching control circuit may maintain the second control signal in an activated state during the predetermined period. That makes it possible to extend the pulse width of the second control signal only in a case where the second control signal is activated as a single pulse during the period during which the first control signal is activated.

Furthermore, if the on-duty ratio of the first control signal is a first value, the switching control circuit may set the predetermined period to a first period, and if the on-duty ratio of the first control signal is a second value that is smaller than the first value, set the predetermined period to a second period that is longer than the first period. That makes it possible to further increase energy that is accumulated in the inductor in a case where a period during which a current is caused to flow to the light-emitting element in digital light control is short.

Alternatively, the switching control circuit may adjust the predetermined period according to a current that flows to the light-emitting element. That makes it possible to further increase energy that is accumulated in the inductor in a case where the current that flows to the light-emitting element is smaller.

In addition, in a case where the on-duty ratio of the first control signal is smaller than the predetermined value, the switching control circuit may extend, by a first period, a period during which the second control signal is maintained in an activated state after the first control signal transits from an activated state to a deactivated state if a current that flows to the light-emitting element when the first control signal is activated is smaller than a predetermined value, and shorten, by a second period, the period during which the second control signal is maintained in an activated state after the first control signal transits from an activated state to a deactivated state if a current that flows to the light-emitting element when the first control signal is activated is larger than the predetermined value.

In that case, it is desirable that the second period is longer than the first period. For example, in a case where the on-duty ratio of the first control signal changes from the first value to the second value that is larger than the first value, if the second control signal is generated in accordance with an extension period that was set when the on-duty ratio was the first value, a current that flows to the light-emitting element becomes excessive. In view of this, when an extension period is set next time, the excessive current can be resolved at an early stage by shortening the extension period by the second period that is longer than the first period.

In the above description, the light emission control circuit may receive information regarding the on-duty ratio of the first control signal from outside. That makes it possible for the switching control circuit to adjust the timing for deactivating the second control signal based on the information regarding the on-duty ratio of the first control signal.

A light emission control circuit according to a second aspect of the invention controls a first switching element for controlling a current that flows to a light-emitting element connected between a first node and one end of an inductor and a second switching element for controlling a current that flows from the other end of the inductor to a second node, and the light emission control circuit includes a driving circuit that activates or deactivates a first control signal in order to bring the first switching element into an on-state or an off-state, and a switching control circuit that activates or deactivates a second control signal in order to bring the second switching element into an on-state or an off-state during a period during which the first control signal is activated, shortens a period during which activation of the second control signal is inhibited in a period during which the first control signal is deactivated, if a current that flows to the light-emitting element when the first control signal is activated is smaller than a predetermined value, and extends the period during which activation of the second control signal is inhibited in the period during which the first control signal is deactivated, if the current that flows to the light-emitting element when the first control signal is activated is larger than the predetermined value.

According to the second aspect of the invention, if the current that flows to the light-emitting element when the first control signal for digital light control is activated is smaller than the predetermined value, the period during which activation of the second control signal for analog light control is inhibited in the period during which the first control signal is deactivated is shortened. Accordingly, even in a case where a period during which a current is caused to flow to the light-emitting element in digital light control is short, it is possible to accumulate energy in the inductor so as to prevent reduction, below a current instructed in analog light control, a current that flows to the light-emitting element.

In addition, if the current that flows to the light-emitting element when the first control signal for digital light control is activated is larger than the predetermined value, the period during which activation of the second control signal for analog light control is inhibited in the period during which the first control signal is deactivated is extended. Accordingly, in a case of performing both analog light control and digital light control, it is possible to suppress discharge of energy accumulated in the inductor without being used for light emission and reduce power loss.

In the light emission control circuit according to the first or second aspect of the invention, in a case where timing for deactivating the second control signal is adjusted based on a current that flows to the light-emitting element, the light emission control circuit may further have a sample hold circuit that samples and holds a voltage that is in proportion to a current that flows to the light-emitting element when the first control signal is activated. When the on-duty ratio of the first control signal is small, a period during which a current flows to the light-emitting element is shortened, but the operation speed of the sample hold circuit is higher than that of an operational amplifier, and with the sample hold circuit, a current that flows to the light-emitting element can be measured accurately.

A light source apparatus according to a third aspect of the invention has the light emission control circuit of the first or second aspect, the light-emitting element, the inductor, the first and second switching elements, a capacitor connected between one end of the inductor and a first node, and a diode connected between the other end of the inductor and the first node, and when the first and second switching elements are in an on-state, a current flows to the light-emitting element and the inductor, and energy is accumulated in the inductor, when the first switching element is in an on-state and the second switching element is in an off-state, a current flows to the light-emitting element and the diode due to energy accumulated in the inductor, and when the first switching element is in an off-state and the second switching element is in an on-state, a current flows to the capacitor and the inductor, and energy is accumulated in the inductor.

According to the third aspect of the invention, it is possible to provide a light source apparatus in which power loss is small, and that can accurately control brightness, by the light emission control circuit suppressing discharge of energy accumulated in the inductor without being used for light emission, and preventing reduction in a current that flows to the light-emitting element even in a case where a period during which a current is caused to flow to the light-emitting element in digital light control is short.

A projection-type video display device according to a fourth aspect of the invention has the light source apparatus according to the third aspect of the invention. According to the fourth aspect of the invention, the luminance of a projected image can be controlled accurately while reducing the power consumption of the projection-type video display device using the light source apparatus that can accurately control brightness with small power loss.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below in detail with reference to the drawings. Note that the same reference numericals are given to the same constituent elements, and overlapping description is omitted.

First Embodiment

Figure 1:
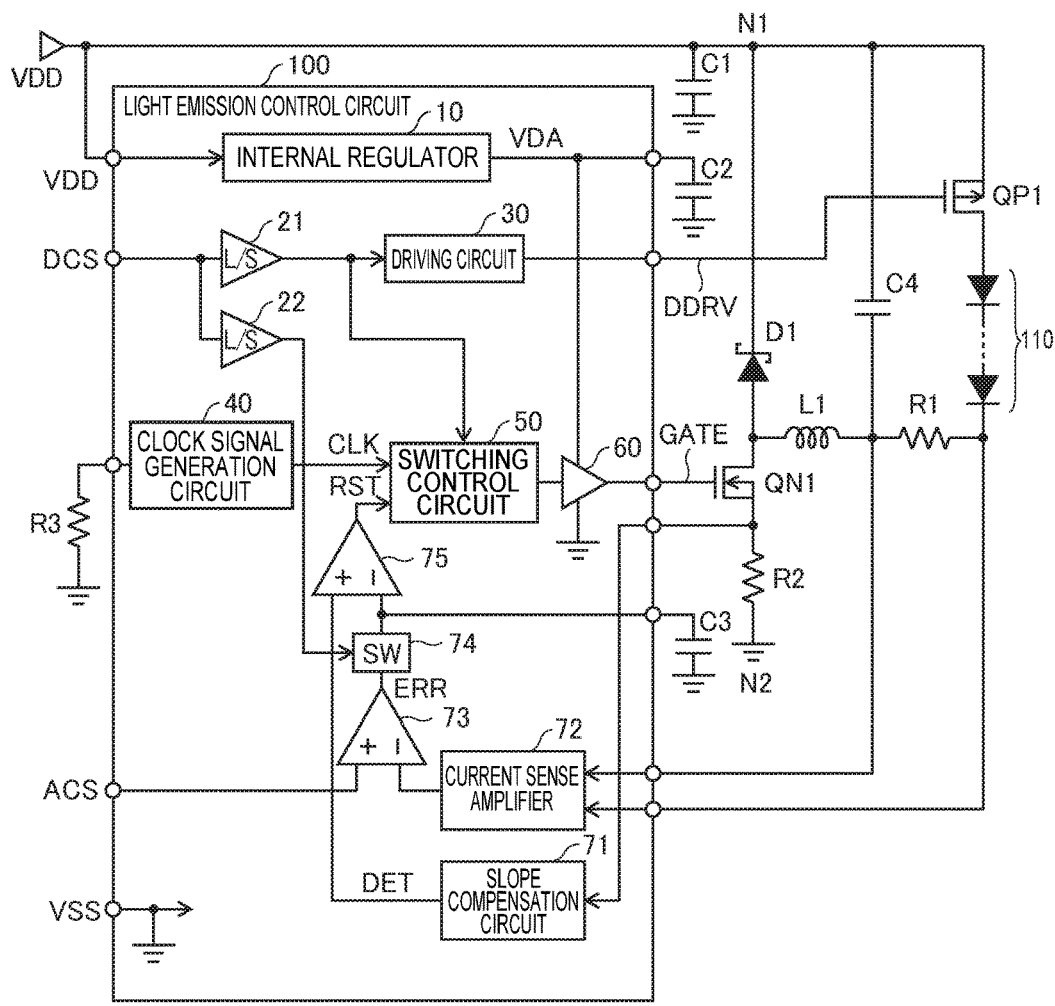
FIG. 1 is a circuit diagram of a light source apparatus that has a light emission control circuit according to a first embodiment of the invention.

FIG. 1 is a circuit diagram showing a configuration example of a light source apparatus that has a light emission control circuit according to a first embodiment of the invention. As shown in FIG. 1, this light source apparatus includes a light emission control circuit 100, a light-emitting element 110, an inductor L1, a P-channel MOS transistor QP1 that is a first switching element, an N-channel MOS transistor QN1 that is a second switching element, a diode D1, resistors R1 to R3, and capacitors C1 to C4.

A power supply potential VDD on the higher potential side is supplied to a first node N1 of the light source apparatus, and a power supply potential VSS on the lower potential side is supplied to a second node N2. FIG. 1 shows a case where the power supply potential VSS is a ground potential (0 V). The transistor QP1, the light-emitting element 110, the resistor R1, the inductor L1, the transistor QN1 and the resistor R2 are connected in series between the first node N1 and the second node N2. The light-emitting element 110 includes at least one laser diode (LD) or light emitting diode (LED), for example, and emits light with brightness that is based on the magnitude of a current that is supplied.

The transistor QP1 may be connected either between the light-emitting element 110 and the resistor R1 or between the resistor R1 and the inductor L1, but in the example shown in FIG. 1, the transistor QP1 is connected between the first node N1 and the light-emitting element 110. The transistor QP1 has a source connected to the first node N1, a drain connected to the light-emitting element 110, and a gate to which a first control signal DDRV is applied.

The transistor QP1 is provided for digital light control, and controls a current that flows to the light-emitting element 110 connected between the first node N1 and one end of the inductor L1. The transistor QP1 is in an on-state when the first control signal DDRV is activated to a low level, and is in an off-state when the first control signal DDRV is deactivated to a high level. When the first control signal DDRV is alternately activated and deactivated, the transistor QP1 performs a switching operation.

The resistor R1 is connected between the light-emitting element 110 and the one end of the inductor L1, has a small resistance value of about 50 mΩ, for example, and is used for detecting a current that flows through the transistor QP1 and the light-emitting element 110. The transistor QN1 has a drain connected to the other end of the inductor L1, a source connected to the second node N2 via the resistor R2, and a gate to which a second control signal GATE is applied.

The transistor QN1 is provided for analog light control, and controls a current that flows from the other end of the inductor L1 to the second node N2. The transistor QN1 is in an on-state when the second control signal GATE is activated to a high level, and is in an off-state when the second control signal GATE is deactivated to a low level. When the second control signal GATE is alternately activated and deactivated, the transistor QN1 performs a switching operation.

The resistor R2 is connected between the source of the transistor QN1 and the second node N2, has a small resistance value of about 100 mΩ, for example, and is used for detecting a current that flows through the transistor QN1. Note that bipolar transistors, IGBTs (Insulated Gate Bipolar Transistors), thyristors or the like can be used as the switching elements, besides MOS transistors.

The diode D1 is connected between the other end of the inductor L1 and the first node N1, and has an anode connected to the other end the inductor L1 and a cathode connected to the first node N1. For example, a Schottky barrier diode whose forward voltage is lower and whose switching speed is higher compared to a PN junction diode is used as the diode D1.

The capacitor C1 is connected between the first node N1 and the second node N2, and smoothes a power supply voltage (VDD-VSS). The capacitor C4 is connected between the one end of the inductor L1 and the first node N1, and smoothes a stepped-down voltage acquired by stepping down the power supply voltage (VDD-VSS).

Light Emission Control Circuit

The light emission control circuit 100 controls the transistors QP1 and QN1 of the light source apparatus when a digital light control signal DCS and an analog light control signal ACS are supplied from an external microcomputer or the like. FIG. 1 shows an example in which the light emission control circuit 100 is incorporated in a single semiconductor device (IC), but the light emission control circuit 100 may be constituted by a plurality of discrete parts or ICs. In addition, the diode D1, the resistors R1 or R2, and the like may be incorporated in the IC.

As shown in FIG. 1, the light emission control circuit 100 includes an internal regulator 10, level shifters 21 and 22, a driving circuit 30, a clock signal generation circuit 40, a switching control circuit 50, a driving circuit 60, and circuits including a slope compensation circuit 71 to a comparator 75 provided in the feedback group of the switching control circuit 50.

The internal regulator 10 includes a reference voltage generation circuit configured by a band gap reference circuit and the like, and generates an internal power supply potential VDA that is supplied to the internal circuit of the IC, based on the power supply potential VDD. The capacitor C2 is connected between the output terminal of the internal regulator 10 and the second node N2, and smoothes an internal power supply voltage (VDA-VSS). The level shifters (L/S) 21 and 22 shift a high level potential of the digital light control signal DCS to a potential compatible with the internal circuit of the IC.

The driving circuit 30 generates the first control signal DDRV for controlling the transistor QP1 based on the digital light control signal DCS supplied from the level shifter 21. For example, the driving circuit 30 generates an inverted signal by inverting the digital light control signal DCS, and generates the first control signal DDRV by causing a high level potential of the inverted signal to be substantially equal to the power supply potential VDD.

In that case, when the digital light control signal DCS is activated to a high level, the transistor QP1 enters an on-state, and a current flows to the light-emitting element 110. Therefore, by changing the duty ratio of the digital light control signal DCS, it is possible to change a period during which a current flows to the light-emitting element 110, so as to perform digital light control.

The clock signal generation circuit 40 includes a CR oscillation circuit and the like, and generates a clock signal CLK that has a predetermined frequency by performing an oscillation operation. The oscillation frequency of the CR oscillation circuit depends on a time constant, which is the product of the capacitance value of the capacitor and the resistance value of the resistor. The resistor R3 is externally mounted on the IC in order to adjust the oscillation frequency of the CR oscillation circuit.

The switching control circuit 50 generates the second control signal GATE for controlling the transistor QN1, based on the clock signal CLK, a reset signal RST, and the digital light control signal DCS that is supplied from the level shifter 21. The second control signal GATE is applied to the gate of the transistor QN1 via the driving circuit 60 constituted by a driver amplifier and the like. A power supply potential supplied to the driving circuit 60 may be the internal power supply potential VDA, or another power supply potential that is higher than the internal power supply potential VDA.

When the transistors QP1 and QN1 are in an on-state, a current flows from the first node N1 to the second node N2 via the light-emitting element 110, the inductor L1, and the like, and in the inductor L1, electrical energy is converted into magnetic energy, and is accumulated. When the transistor QP1 is in an on-state, and the transistor QN1 is in an off-state, the magnetic energy accumulated in the inductor L1 is discharged as electrical energy, and a current flows to the light-emitting element 110, the diode D1, and the like. When the transistor QP1 is in an off-state, and the transistor QN1 is in an on-state, a current flows to the capacitor C4, the inductor L1 and the like, and energy is accumulated in the inductor L1.

The slope compensation circuit 71 adds a bias voltage to the voltage between the two ends of the resistor R2 for current detection, generates a detection signal DET, and supplies the detection signal DET to a non-inverting input terminal of the comparator 75. A current sense amplifier 72 amplifies the voltage between the two ends of the resistor R1 for current detection, generates an output signal, and supplies the output signal to an inverting input terminal of an operational amplifier 73.

The analog light control signal ACS is supplied to a non-inverting input terminal of the operational amplifier 73. The operational amplifier 73 amplifies the difference between the voltage of the analog light control signal ACS and the voltage of the output signal of the current sense amplifier 72, generates an error signal ERR, and supplies the error signal ERR to a switch circuit (SW) 74.

The switch circuit 74 is constituted by an analog switch and the like, and is in an on-state when the digital light control signal DCS supplied from the level shifter 22 is activated, and is in an off-state when the digital light control signal DCS is deactivated. Accordingly, the voltage of the error signal ERR generated when the transistor QP1 was in an on-state is held in the capacitor C3, and is supplied to an inverting input terminal of the comparator 75.

The comparator 75 compares the voltage of the detection signal DET supplied from the slope compensation circuit 71 with the voltage of the error signal ERR, and thereby generates the reset signal RST that is based on the comparison result, and supplies the reset signal RST to the switching control circuit 50.

When the digital light control signal DCS is activated to a high level and the transistor QP1 enters an on-state, the switching control circuit 50 activates the second control signal GATE to a high level in synchronization with rise of the clock signal CLK. Accordingly, the transistor QN1 enters an on-state, and a current flows from the first node N1 to the resistor R2 for current detection via the light-emitting element 110, the inductor L1, and the like.

A current that flows to the inductor L1 gradually increases over time. As a current that flows to the resistor R2 via the inductor L1 and the like increases, the voltage of the detection signal DET rises. When the voltage of the detection signal DET exceeds the voltage of the error signal ERR held in the capacitor C3, the reset signal RST is activated to a high level. Accordingly, the second control signal GATE is deactivated to a low level, and the transistor QN1 enters an off-state.

In such a PWM (Pulse Width Modulation) operation, when the voltage of the analog light control signal ACS rises, the on-duty ratio of the second control signal GATE increases, a period during which the transistor QN1 is in an on-state is extended, and a current that flows to the light-emitting element 110 increases. Therefore, by changing the voltage of the analog light control signal ACS, it is possible to change a current that flows to the light-emitting element 110 so as to perform analog light control.

On the other hand, when the transistor QP1 is in an off-state, a current does not flow to the light-emitting element 110. However, when the transistor QN1 enters an on-state, a current flows from the inductor L1 to the second node N2 via the transistor QN1, and thus energy accumulated in the inductor L1 is discharged without being used for light emission in the light-emitting element 110. As a result, in a projection-type video display device that uses such a light source apparatus, there is a defect, or specifically, occurrence of wasteful power loss.

In view of this, in this embodiment, when alternately activating and deactivating the second control signal GATE, the switching control circuit 50 deactivates the second control signal GATE in order to bring the transistor QN1 into an off-state, during a period during which the driving circuit 30 deactivates the first control signal DDRV in order to bring the transistor QP1 into an off-state.

Figure 2:
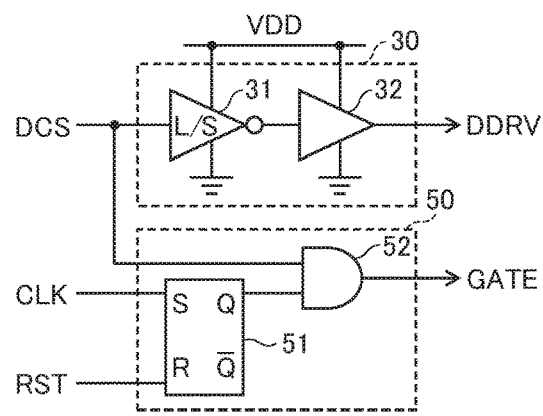
FIG. 2 is a circuit diagram showing a configuration example of the driving circuit and switching control circuit shown in FIG. 1.

FIG. 2 is a circuit diagram showing a configuration example of the driving circuit and the switching control circuit shown in FIG. 1. As shown in FIG. 2, the driving circuit 30 includes a level shifter 31 and a driver amplifier 32 to which the power supply potential VDD and the power supply potential VSS (ground potential) are supplied. For example, the level shifter 31 inverts the digital light control signal DCS supplied from the level shifter 21 shown in FIG. 1, and generates the first control signal DDRV. A high level potential of the first control signal DDRV is substantially equal to the power supply potential VDD. The first control signal DDRV is applied to the gate of the transistor QP1 (FIG. 1) via the driver amplifier 32. Note that the power supply potential VDD and a power supply potential VHB may be supplied to the level shifter 31 and the driver amplifier 32.

The switching control circuit 50 includes an RS flip flop 51 and an AND circuit 52, for example. When the reset signal RST is at a low level, the RS flip flop 51 is set in synchronization with rise of the clock signal CLK, and activates an output signal to a high level, and when the clock signal CLK is at a low level, the RS flip flop 51 is reset in synchronization with rise of the reset signal RST, and deactivates an output signal to a low level.

The AND circuit 52 generates the second control signal GATE by obtaining the logical product of the digital light control signal DCS and an output signal of the RS flip flop 51. Therefore, when the digital light control signal DCS is deactivated to a low level, the first control signal DDRV is deactivated to a high level, and the second control signal GATE is deactivated to a low level.

Exemplary Operation

Figure 3:
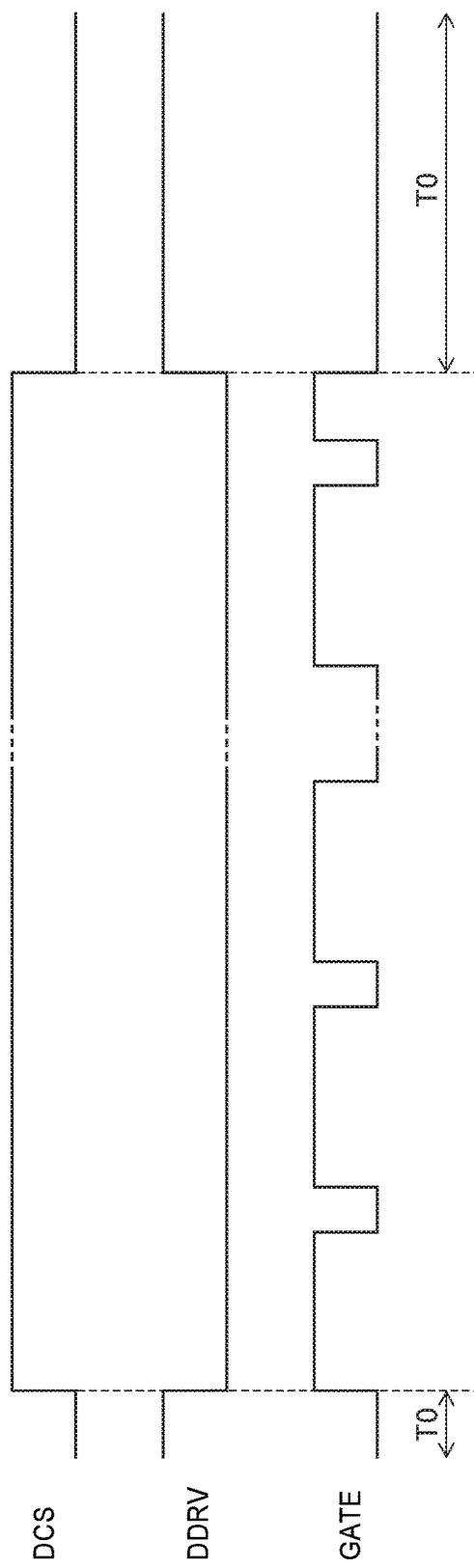
FIG. 3 is a timing chart for illustrating an exemplary operation of the light emission control circuit shown in FIG. 1.

FIG. 3 is a timing chart for illustrating an exemplary operation of the light emission control circuit shown in FIG. 1. In FIG. 3, the amplitudes of the signals are normalized to a fixed value. In this example, the driving circuit 30 inverts the digital light control signal DCS, and generates the first control signal DDRV. When the first control signal DDRV is activated to a low level, the transistor QP1 enters an on-state, and when the first control signal DDRV is deactivated to a high level, the transistor QP1 enters an off-state.

For example, in a first light control mode in which the light-emitting element 110 emits relatively bright light, the driving circuit 30 always activates the first control signal DDRV. On the other hand, in a second light control mode in which the light-emitting element 110 emits relatively dim light (dimmer than in the first light control mode), the driving circuit 30 adjusts the length of a period during which a current flows to the light-emitting element 110, by alternately activating and deactivating the first control signal DDRV in accordance with the duty ratio of the digital light control signal DCS.

In the first and second light control modes, the switching control circuit 50 adjusts the magnitude of a current that flows to the light-emitting element 110, by alternately activating and deactivating the second control signal GATE in accordance with the voltage of the analog light control signal ACS. Accordingly, a configuration is possible in which, in the first light control mode in which the light-emitting element 110 emits relatively bright light, only analog light control is performed, and in the second light control mode in which the light-emitting element 110 emits relatively dim light, digital light control is performed in addition to analog light control.

When the second control signal GATE is activated to a high level, the transistor QN1 enters an on-state, and when the second control signal GATE is deactivated to a low level, the transistor QN1 enters an off-state. As shown in FIG. 3, the switching control circuit 50 deactivates the second control signal GATE to a low level during a period T0 during which the driving circuit 30 deactivates the first control signal DDRV to a high level.

With the light emission control circuit 100 according to this embodiment, in a case of performing both analog light control and digital light control, the transistor QN1 for analog light control is maintained in an off-state during a period during which the transistor QP1 for digital light control is in an off-state, and a current does not flow to the light-emitting element 110. That makes it possible to suppress discharge of energy accumulated in the inductor L1 without being used for light emission, and reduce power loss.

Second Embodiment

Figure 4:
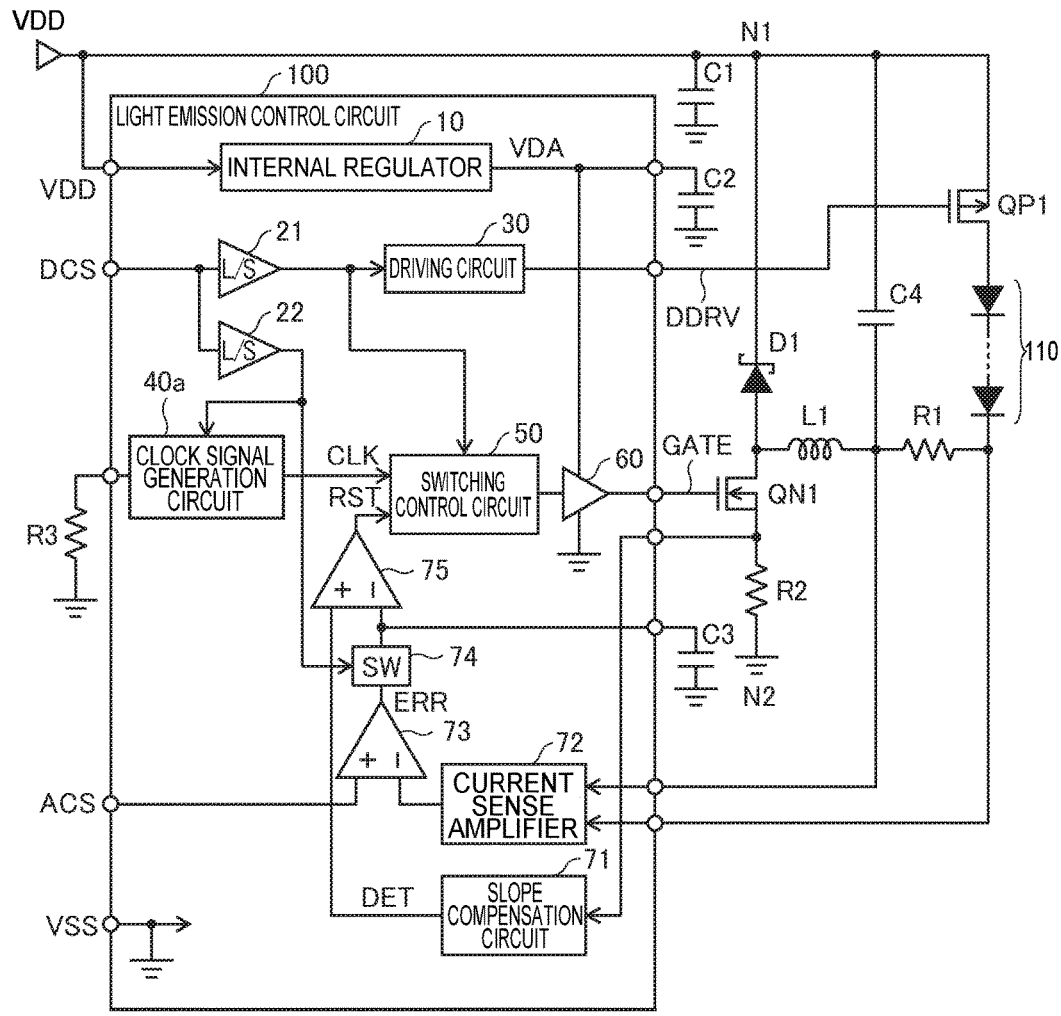
FIG. 4 is a circuit diagram of a light source apparatus that has a light emission control circuit according to a second embodiment of the invention.
Figure 5:
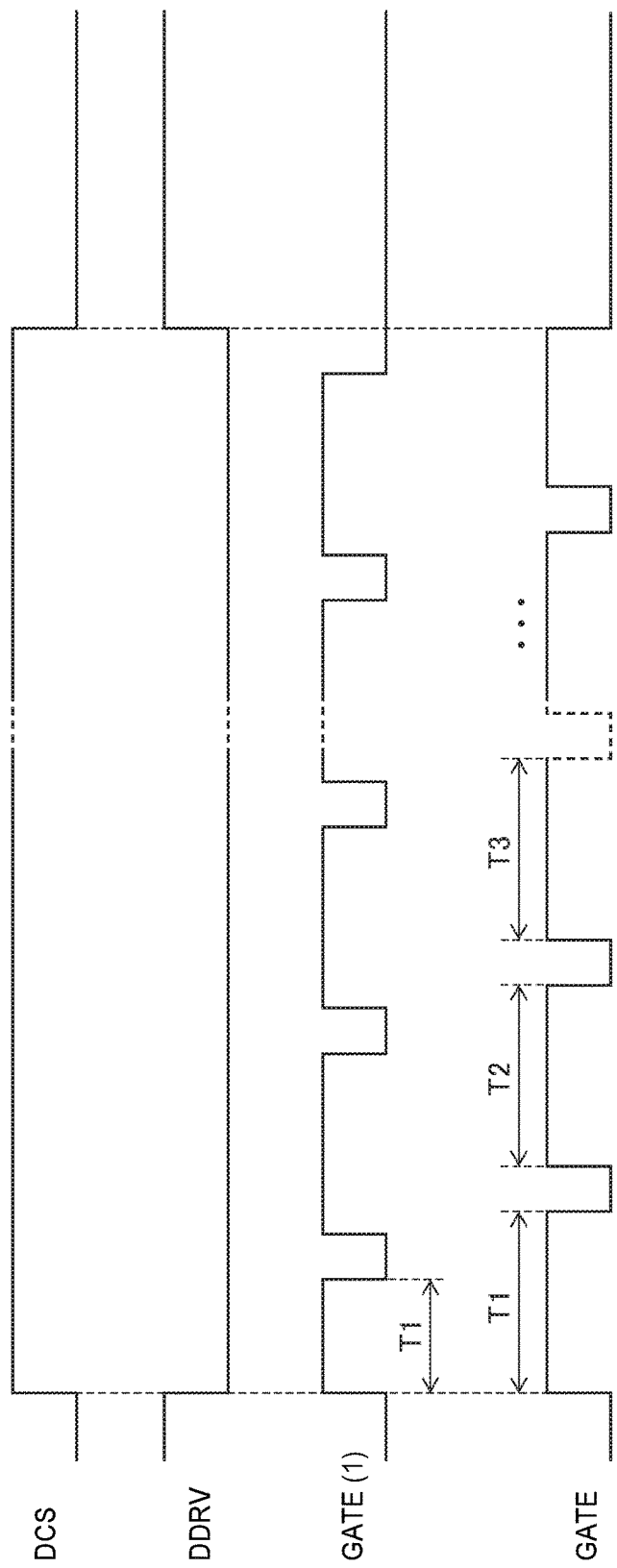
FIG. 5 is a timing chart in which the light emission control circuits shown in FIGS. 1 and 4 are compared.

FIG. 4 is a circuit diagram showing a configuration example of a light source apparatus that has a light emission control circuit according to a second embodiment of the invention. In the second embodiment, a clock signal generation circuit 40a is used in place of the clock signal generation circuit 40 according to the first embodiment shown in FIG. 1. In the other respects, the second embodiment may be similar to the first embodiment. In addition, FIG. 5 is a timing chart showing operations of the light emission control circuits shown in FIGS. 1 and 4 in comparison. In FIG. 5, the amplitudes of the signals are normalized to a fixed value.

In the light emission control circuit 100 according to the first embodiment shown in FIG. 1, the clock signal generation circuit 40 operates independently from the digital light control signal DCS. Therefore, in a case where the transistor QP1 for digital light control performs a switching operation, and the light-emitting element 110 intermittently emits light, the timing when the second control signal GATE (1) is first activated after the first control signal DDRV is activated delays, depending on the timing when the digital light control signal DCS is activated. Alternatively, as shown in FIG. 5, an activation period T1 during which the second control signal GATE (1) is first maintained in an activated state after the first control signal DDRV is activated is shortened.

If the timing when the transistor QN1 first enters an on-state after the transistor QP1 enters an on-state delays, in a state where sufficient energy is not accumulated in the inductor L1, a light emission timing of the light-emitting element 110 delays, or a sufficient current does not flow to the light-emitting element 110. In addition, if the activation period T1 is short, the transistor QN1 transits to an off-state before sufficient energy is accumulated in the inductor L1, and thus a sufficient current does not flow to the light-emitting element 110. As a result, there are cases where a light emission timing or brightness of the light-emitting element 110 changes, giving a sense of incongruity to an operator of the light source apparatus. Also, there is a risk that the luminance of a projected image changes due to a projection-type video display device that uses such a light source apparatus.

In view of this, in the second embodiment, a switching control circuit 50 starts activation of a second control signal GATE in synchronization with activation of a first control signal DDRV. Accordingly, in a case where a light-emitting element 110 intermittently emits light according to digital light control, when a transistor QP1 enters an on-state, a transistor QN1 also enters an on-state, and thus it is possible to reduce change in the light emission timing or brightness of the light-emitting element 110. In addition, it is possible to reduce change in the luminance of an image projected by a projection-type video display device that has such a light source apparatus.

Furthermore, the switching control circuit 50 may set the activation period T1 (FIG. 5) during which the second control signal GATE is first maintained in an activated state after the first control signal DDRV is activated, to be longer than or equal to a predetermined period. Here, it is desirable that the predetermined period is within a range of 95% or less of an activation period T2 during which the second control signal GATE is maintained in an activated state at the second time after the first control signal DDRV is activated.

Accordingly, in a case where the light-emitting element 110 intermittently emits light according to digital light control, the transistor QN1 transits to an off-state after the transistor QN1 enters an on-state and sufficient energy is accumulated in the inductor L1, and thus it is possible to reduce change in the brightness of the light-emitting element 110. In this regard, in a case of masking the pulse of the second control signal GATE that is generated first after the first control signal DDRV is activated, generation of a short pulse can be prevented, but there is a problem that activation of the second control signal GATE delays.

A light emission control circuit 100 shown in FIG. 4 has the clock signal generation circuit 40a that starts generation of a clock signal CLK in synchronization with activation of the first control signal DDRV supplied from a level shifter 22, and the switching control circuit 50 activates the second control signal GATE in synchronization with the clock signal CLK. Accordingly, the timing for activating the second control signal GATE can be synchronized with the timing for activating the first control signal DDRV.

Figure 6:
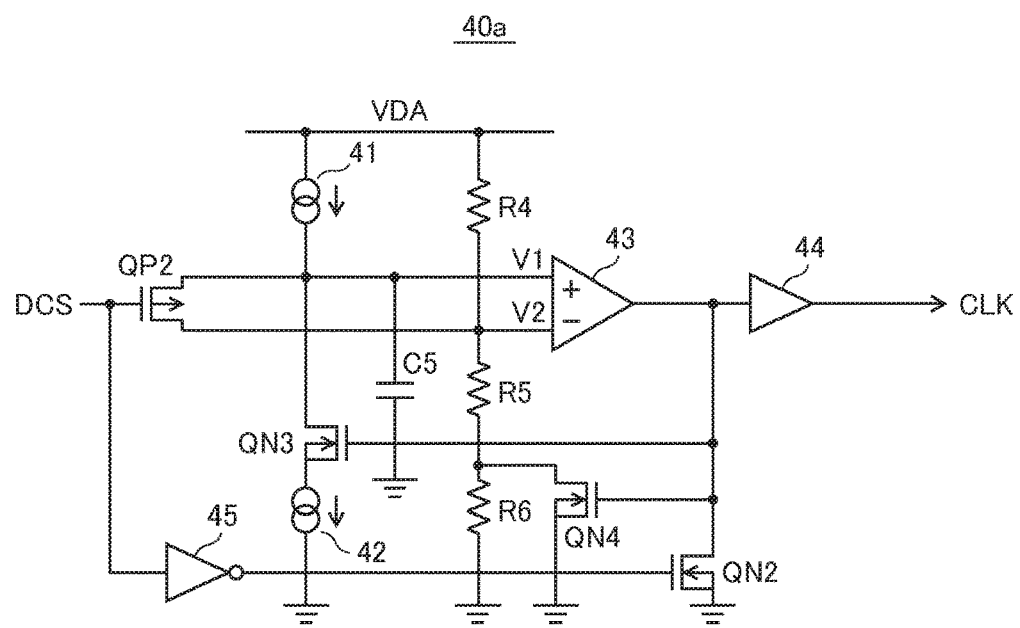
FIG. 6 is a circuit diagram showing a configuration example of the clock signal generation circuit shown in FIG. 4.
Figure 7:
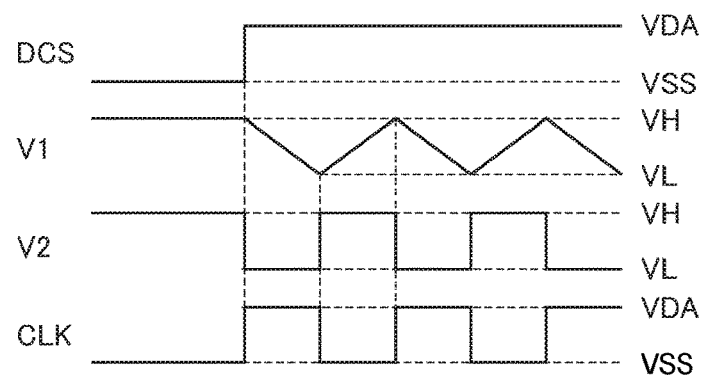
FIG. 7 is a waveform diagram showing the waveforms at the nodes of the clock signal generation circuit shown in FIG. 6.

FIG. 6 is a circuit diagram showing a configuration example of the clock signal generation circuit shown in FIG. 4, and FIG. 7 is a waveform diagram showing the waveforms of nodes of the clock signal generation circuit shown in FIG. 6. The clock signal generation circuit 40a operates when an internal power supply potential VDA and a power supply potential VSS of the IC are supplied. Hereinafter, the power supply potential VSS is a ground potential (0 V).

As shown in FIG. 6, the clock signal generation circuit 40a includes constant current sources 41 and 42, a comparator 43, a buffer circuit 44, an inverter 45, a P-channel MOS transistor QP2, N-channel MOS transistors QN2 to QN4, resistors R4 to R6, and a capacitor C5.

The constant current source 41 is connected between the interconnect of the internal power supply potential VDA of the IC and a non-inverting input terminal of the comparator 43. The constant current source 42 is connected between the non-inverting input terminal of the comparator 43 and the interconnect of the power supply potential VSS via the transistor QN3. For example, the constant current sources 41 and 42 are respectively constituted by a P-channel MOS transistor and an N-channel MOS transistor that supply a constant current when a predetermined bias voltage is applied between the gate and source thereof.

The comparator 43 compares an input potential V1 that is supplied to the non-inverting input terminal with an input potential V2 that is supplied to the inverting input terminal, and outputs, from the output terminal, the clock signal CLK that is based on the comparison result. The buffer circuit 44 buffers the clock signal CLK that is supplied from the comparator 43, and outputs the clock signal CLK. The inverter 45 inverts a digital light control signal DCS, and outputs the inverted digital light control signal DCS.

The transistor QP2 has a source connected to the non-inverting input terminal of the comparator 43, a drain connected to the inverting input terminal of the comparator 43, and a gate to which the digital light control signal DCS is applied. The transistor QN2 has a drain connected to the output terminal of the comparator 43, a source connected to the interconnect of the power supply potential VSS, and a gate to which an output signal of the inverter 45 is applied.

The capacitor C5 is connected between the non-inverting input terminal of the comparator 43 and the interconnect of the power supply potential VSS. The resistor R4 is connected between the interconnect of the internal power supply potential VDA of the IC and the inverting input terminal of the comparator 43. The resistors R5 and R6 are connected in series between the inverting input terminal of the comparator 43 and the interconnect of the power supply potential VSS.

The transistor QN3 has a drain connected to the non-inverting input terminal of the comparator 43, a source connected to the interconnect of the power supply potential VSS via the constant current source 42, and a gate to which an output signal of the comparator 43 is applied. The transistor QN4 has a drain connected to the connection point between the resistors R5 and R6, a source connected to the interconnect of the power supply potential VSS, and a gate to which an output signal of the comparator 43 is applied.

When the digital light control signal DCS is deactivated to a low level (VSS), the transistors QP2 and QN2 are in an on-state. Accordingly, the clock signal CCK that is output from the comparator 43 is at a low level, and the transistors QN3 and QN4 are in an off-state.

Therefore, the input potentials V1 and V2 that are supplied to the comparator 43 are substantially equal to a divided voltage VH acquired by dividing the power supply voltage VDA using the resistors R4 to R6.

$$VH=\{(R5+R6)/(R4+R5+R6)\}VDA \qquad 1$$

In actuality, the input potentials V1 and V2 are somewhat higher than the divided voltage VH represented by Expression 1 due to a current that is supplied from the constant current source 41. In addition, the capacitor C5 is charged by the input potential V1.

When the digital light control signal DCS is activated to a high level (VDA), the transistors QP2 and QN2 enter an off-state. Accordingly, the non-inverting input terminal and the inverting input terminal of the comparator 43 are isolated electrically. The input potential V2 of the inverting input terminal of the comparator 43 falls to the divided voltage VH represented by Expression 1, which is below the input potential V1 of the non-inverting input terminal of the comparator 43, and thus the clock signal CLK that is output from the comparator 43 transits to a high level, and the transistors QN3 and QN4 enter an on-state.

Therefore, electric charges charged in the capacitor C5 are discharged via the transistor QN3 and the constant current source 42, and thus the input potential V1 of the non-inverting input terminal of the comparator 43 gradually falls toward the power supply potential VSS. In addition, the input potential V2 of the inverting input terminal of the comparator 43 immediately falls to a divided voltage VL represented by Expression 2 below.

$$VL=\{R5/(R4+R5)\}VDA \qquad 2$$

When the input potential V1 of the non-inverting input terminal of the comparator 43 falls below the divided voltage VL, the clock signal CLK that is output from the comparator 43 transits to a low level, and the transistors QN3 and QN4 enter an off-state. Therefore, the capacitor C5 is charged with a current that is supplied from the constant current source 41, and thus the input potential V1 of the non-inverting input terminal of the comparator 43 gradually rises toward the internal power supply potential VDA of the IC. In addition, the input potential V2 of the inverting input terminal of the comparator 43 immediately rises to the divided voltage VH represented by Expression 1.

When the input potential V1 of the non-inverting input terminal of the comparator 43 rises above the divided voltage VH, the clock signal CLK that is output from the comparator 43 transits to a high level. By repeating such an operation, the clock signal generation circuit 40a generates the clock signal CLK having a predetermined frequency.

Third Embodiment

Figure 8:
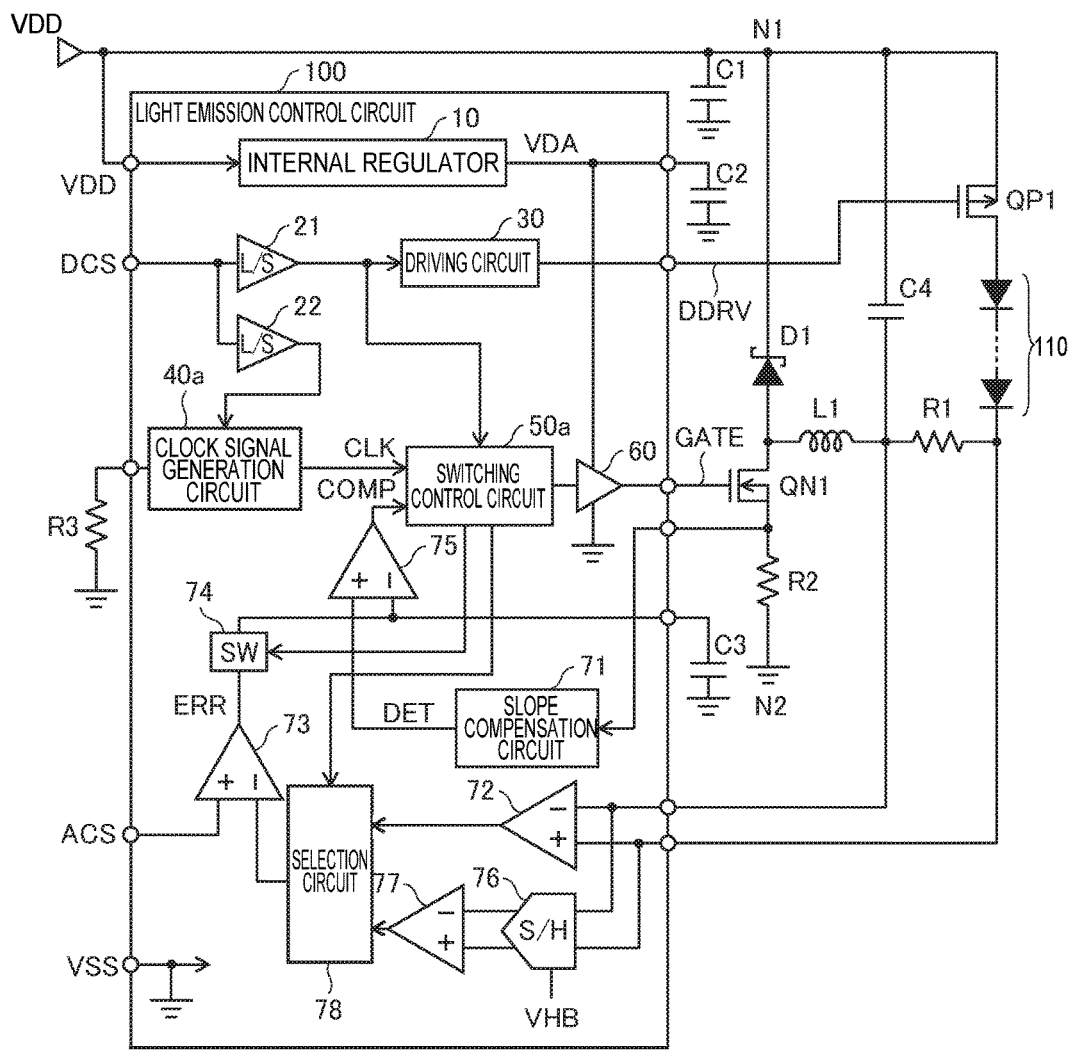
FIG. 8 is a circuit diagram of a light source apparatus that has a light emission control circuit according to a third embodiment of the invention.

FIG. 8 is a circuit diagram showing a configuration example of a light source apparatus that has a light emission control circuit according to a third embodiment of the invention. In the third embodiment, a switching control circuit 50a is used in place of the switching control circuit 50 in the second embodiment shown in FIG. 4. Also, circuits provided in the feedback group of the switching control circuit 50a are added. In the other respects, the third embodiment may be similar to the second embodiment.

As in the second embodiment, if a transistor QN1 is maintained in an off-state during a period during which a transistor QP1 is in an off-state, in a case where an on-period of the transistor QP1 is short (for example, in a case where on-duty ratio is smaller than 5%), there is a risk that an on-period of the transistor QN1 is shorter than an on-period that is essentially necessary.

In such a case, sufficient energy is not accumulated in an inductor L1, and energy accumulated in the inductor L1 gradually decreases in an off-period of the transistor QN1, and thus a current that flows to a light-emitting element 110 decreases below a current instructed by an analog light control signal ACS, and the luminance of the light-emitting element 110 becomes insufficient.

In view of this, in the third embodiment, during a period during which a first control signal DDRV is activated, the switching control circuit 50a activates or deactivates a second control signal GATE in order to bring the transistor QN1 into an on-state or an off-state, and if the on-duty ratio of the first control signal DDRV is larger than or equal to a predetermined value, maintains the second control signal GATE in a deactivated state during a period during which the first control signal DDRV is deactivated, and if the on-duty ratio of the first control signal DDRV is smaller than the predetermined value, maintains the second control signal GATE in an activated state during a portion of the period during which the first control signal DDRV is deactivated.

According to the third embodiment, if the on-duty ratio of the first control signal DDRV for digital light control is larger than or equal to the predetermined value, the transistor QN1 is maintained in an off-state by maintaining the second control signal GATE for analog light control in a deactivated state during the period during which the first control signal DDRV is deactivated. Accordingly, in a case of performing both analog light control and digital light control, it is possible to suppress discharge of energy accumulated in the inductor L1 without being used for light emission, and reduce power loss.

In addition, if the on-duty ratio of the first control signal DDRV for digital light control is smaller than the predetermined value, the transistor QN1 is maintained in an on-state by maintaining the second control signal GATE for analog light control in an activated state during a portion of the period during which the first control signal DDRV is deactivated. Accordingly, even in a case where a period during which a current is caused to flow to the light-emitting element 110 in digital light control is short, it is possible to accumulate energy in the inductor L1 so as to prevent reduction of a current that flows to the light-emitting element 110 below a current instructed in analog light control.

As shown in FIG. 8, in the feedback group of the switching control circuit 50a, in addition to the circuits from the slope compensation circuit 71 to the comparator 75 in the second embodiment that are shown in FIG. 4, a sample hold circuit 76, a current sense amplifier 77, and a selection circuit 78 are provided.

A driving circuit 30 activates or deactivates the first control signal DDRV in order to bring the transistor QP1 into an on-state or an off-state. For example, the driving circuit 30 inverts a digital light control signal DCS supplied from a level shifter 21 so as to generate an inverted signal, and causes a high level potential of the inverted signal to be substantially equal to a power supply potential VDD so as to generate the first control signal DDRV.

The slope compensation circuit 71 adds a bias voltage to the voltage between the two ends of a resistor R2 for current detection so as to generate a detection signal DET, and supplies the detection signal DET to the non-inverting input terminal of the comparator 75. The current sense amplifier 72 amplifies the voltage between the two ends of a resistor R1 (a current detection voltage) that is in proportion to a current that flows to the light-emitting element 110, so as to generate an output signal. The sample hold circuit 76 operates when the power supply potential VDD (e.g., 50 V) and a power supply potential VHB (e.g., 45 V) are supplied thereto, and samples and holds a current detection voltage that is in proportion to a current that flows to the light-emitting element 110 when the first control signal DDRV is activated.

When the on-duty ratio of the first control signal DDRV decreases, a period during which a current flows to the light-emitting element 110 is shortened, but the operation speed of the sample hold circuit 76 is higher than that of the operational amplifier, and the sample hold circuit 76 can accurately measure a current that flows to the light-emitting element 110. The current sense amplifier 77 amplifies the current detection voltage held in the sample hold circuit 76 so as to generate an output signal.

The selection circuit 78 selects either an output signal of the current sense amplifier 72 or an output signal of the current sense amplifier 77 in accordance with a selection signal supplied from the switching control circuit 50a, and supplies the selected signal to the inverting input terminal of the operational amplifier 73. The analog light control signal ACS is supplied to the non-inverting input terminal of the operational amplifier 73. The operational amplifier 73 amplifies the difference between the voltage of the analog light control signal ACS and the voltage of the signal selected by the selection circuit 78, so as to generate an error signal ERR, and supplies the error signal ERR to the switch circuit 74.

The switch circuit 74 enters an off-state in accordance with a control signal supplied from the switching control circuit 50a, during a period during which the digital light control signal DCS is deactivated to a low level and a predetermined mask period, and is in an on-state during a period other than those periods. Accordingly, the voltage of the error signal ERR generated when the switch circuit 74 was in an on-state is held in a capacitor C3, and is supplied to the inverting input terminal of the comparator 75.

The comparator 75 compares the voltage of the detection signal DET supplied from the slope compensation circuit 71 with the voltage of the error signal ERR so as to generate a comparison result signal COMP that is based on the comparison result, and supplies the comparison result signal COMP to the switching control circuit 50a.

The switching control circuit 50a activates or deactivates the second control signal GATE based on the clock signal CLK, the comparison result signal COMP, and the digital light control signal DCS supplied from the level shifter 21 in order to bring the transistor QN1 into an on-state or an off-state.

Figure 9:
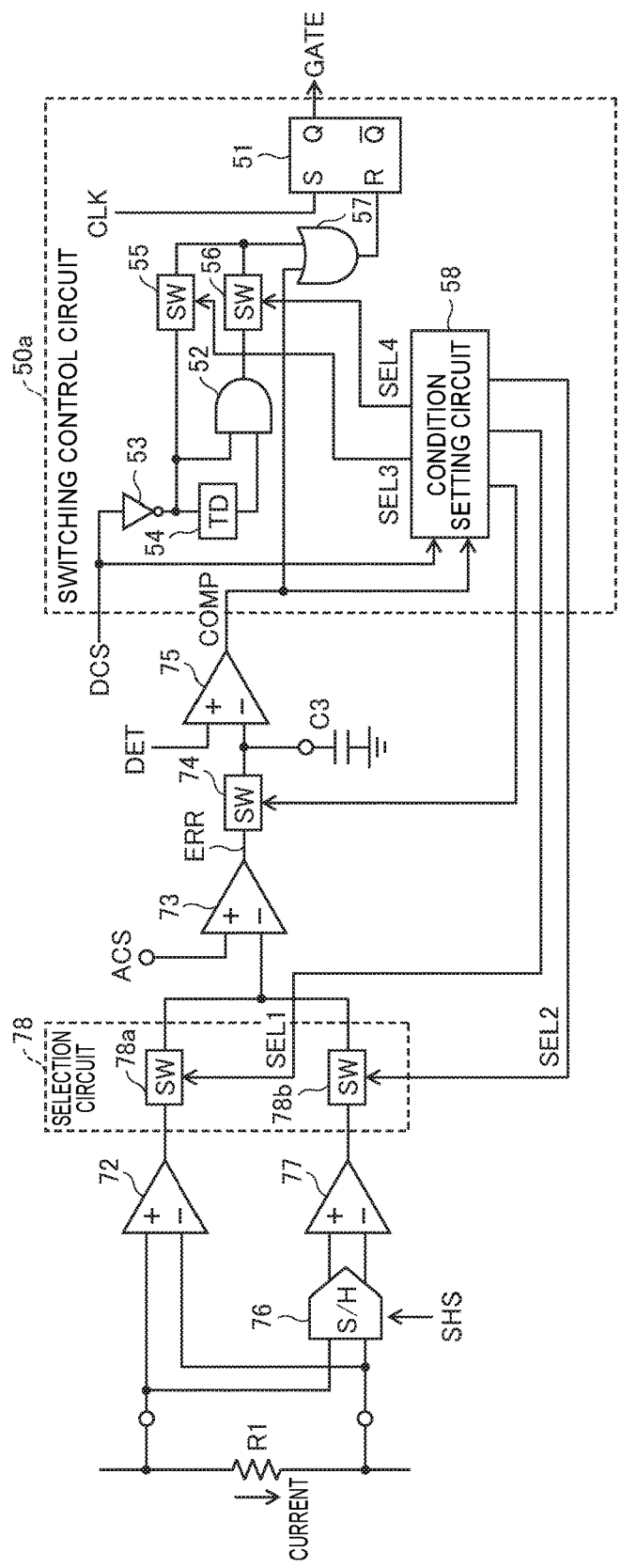
FIG. 9 is a circuit diagram of the switching control circuit shown in FIG. 8 and a feedback group thereof.

FIG. 9 is a circuit diagram showing a configuration example of the switching control circuit shown in FIG. 8 and the circuits of the feedback group thereof. In this example, the switching control circuit 50a includes a RS flip flop 51, an AND circuit 52, an inverter 53, a delay circuit 54, switch circuits 55 and 56, an OR circuit 57, and a condition setting circuit 58.

When an output signal of the OR circuit 57 is at a low level, the RS flip flop 51 is set in synchronization with rise of the clock signal CLK, and activates the second control signal GATE to a high level, and when the clock signal CLK is at a low level, the RS flip flop 51 is reset in synchronization with rise of an output signal of the OR circuit 57, and deactivates the second control signal GATE to a low level.

The inverter 53 inverts the digital light control signal DCS that is supplied from the level shifter 21 (FIG. 8) so as to generate an output signal. For example, the delay circuit 54 is constituted by a plurality of delay elements such as inverters that cause a gate delay, or a resistor, a capacitor and the like, and delays the output signal of the inverter 53 by a delay time TD.

The AND circuit 52 generates an output signal by obtaining the logical product of an output signal of the inverter 53 and an output signal of the delay circuit 54. The output signal of the AND circuit 52 is set to a low level at the time when the digital light control signal DCS is activated, and is set to a high level at the time when the delay time TD has elapsed since the digital light control signal DCS was deactivated.

The switch circuits 55 and 56 are constituted by an analog switch and the like, and select either an output signal of the inverter 53 or an output signal of the AND circuit 52. The OR circuit 57 generates an output signal by obtaining the logical sum of the signal selected by the switch circuits 55 and 56 and the comparison result signal COMP that is output from the comparator 75. The output signal of the OR circuit 57 is supplied to the reset terminal of the RS flip flop 51.

When the signal selected by the switch circuits 55 and 56 is set to a high level, or when the voltage of the detection signal DET rises above the voltage of the error signal ERR and the comparison result signal COMP is set to a high level, the OR circuit 57 generates a high-level output signal. Accordingly, the RS flip flop 51 is reset, and the second control signal GATE is deactivated.

The condition setting circuit 58 is configured by a logic circuit including a combinational circuit or a sequential circuit, and the like, and controls the switch circuits 55 and 56, the switch circuit 74, and the selection circuit 78. For example, the selection circuit 78 includes switch circuits 78a and 78b constituted by an N-channel MOS transistor or various types of transistors and the like, selects either an output signal of the current sense amplifier 72 or an output signal of the current sense amplifier 77, and supplies the selected signal to the inverting input terminal of the operational amplifier 73.

First Exemplary Operation

In a first exemplary operation, a light emission control circuit 100 (FIG. 8) receives, from an external microcomputer or the like, information regarding the on-duty ratio of the digital light control signal DCS, namely, information regarding the on-duty ratio of the first control signal DDRV. Accordingly, the switching control circuit 50a can adjust the timing for deactivating the second control signal GATE, based on the information regarding the on-duty ratio of the first control signal DDRV.

For example, four types of light control modes are set according to the on-duty ratio of the first control signal DDRV, and information for specifying the current light control mode is supplied to the condition setting circuit 58. The condition setting circuit 58 sets a condition for deactivating the second control signal GATE based on the information for specifying the current light control mode, and generates selection signals SEL1 to SEL4.

In a first light control mode, the on-duty ratio of the first control signal DDRV is 100%, and only analog light control is performed. In a second light control mode, the on-duty ratio of the first control signal DDRV is larger than or equal to 50% and smaller than 100%, in a third light control mode, the on-duty ratio of the first control signal DDRV is larger than or equal to 5% and smaller than 50%, and in a fourth light control mode, the on-duty ratio of the first control signal DDRV is larger than 0% and smaller than 5%. In the second to fourth light control modes, both analog light control and digital light control are performed. Note that in this embodiment or the other embodiments, there may be a lower limit value (e.g., 1%) to the on-duty ratio.

In the first and second light control modes, the condition setting circuit 58 activates the selection signal SEL1, and deactivates the selection signal SEL2. Accordingly, the switch circuit 78a enters an on-state, and the switch circuit 78b enters an off-state, and thus an output signal of the current sense amplifier 72 is supplied to the inverting input terminal of the operational amplifier 73.

On the other hand, in the third and fourth light control modes, the condition setting circuit 58 deactivates the selection signal SEL1, and activates the selection signal SEL2. Accordingly, the switch circuit 78a enters an off-state, and the switch circuit 78b enters an on-state, and thus an output signal of the current sense amplifier 77 is supplied to the inverting input terminal of the operational amplifier 73.

Therefore, if the on-duty ratio of the first control signal DDRV is larger than or equal to 50%, the output signal of the current sense amplifier 72 for amplifying a current detection voltage that is in proportion to a current that flows to the light-emitting element 110 is used for adjusting the timing for deactivating the second control signal GATE. On the other hand, if the on-duty ratio of the first control signal DDRV is smaller than 50%, the output signal of the current sense amplifier 77 for amplifying a current detection voltage held in the sample hold circuit 76 is used for adjusting the timing for deactivating the second control signal GATE.

In addition, in the first to third light control modes, the condition setting circuit 58 activates the selection signal SEL3, and deactivates the selection signal SEL4. Accordingly, the switch circuit 55 enters an on-state, and the switch circuit 56 enters an off-state, and thus an output signal of the inverter 53 is supplied to one input terminal of the OR circuit 57. The comparison result signal COMP that is output from the comparator 75 is supplied to the other input terminal of the OR circuit 57.

When the digital light control signal DCS is deactivated to a low level, or when the voltage of the detection signal DET rises above the voltage of the error signal ERR and the comparison result signal COMP is set to a high level, the OR circuit 57 generates a high-level output signal. Accordingly, the RS flip flop 51 is reset, and the second control signal GATE is deactivated. Therefore, if the on-duty ratio of the first control signal DDRV is larger than or equal to 5%, the second control signal GATE is maintained in a deactivated state during a period during which the first control signal DDRV is deactivated.

On the other hand, in the fourth light control mode, the condition setting circuit 58 deactivates the selection signal SEL3, and activates the selection signal SEL4. Accordingly, the switch circuit 55 enters an off-state, and the switch circuit 56 enters an on-state, and thus an output signal of the AND circuit 52 is supplied to one input terminal of the OR circuit 57. The comparison result signal COMP that is output from the comparator 75 is supplied to the other input terminal of the OR circuit 57.

When the delay time TD has elapsed after the digital light control signal DCS is deactivated to a low level, or when the voltage of the detection signal DET rises above the voltage of the error signal ERR and the comparison result signal COMP is set to a high level, the OR circuit 57 generates a high-level output signal. The RS flip flop 51 is thereby reset, and the second control signal GATE is deactivated. Therefore, if the on-duty ratio of the first control signal DDRV is smaller than 5%, the second control signal GATE is maintained in an activated state during a portion of a period during which the first control signal DDRV is deactivated.

Note that a current that flows to the inductor L1 (FIG. 8) gradually increases after the transistor QN1 enters an on-state, and thus if the on-duty ratio of the first control signal DDRV is small, the comparison result signal COMP that is output from the comparator 75 is kept at a low level before and after the timing when the first control signal DDRV is deactivated.

Figure 10:
FIG. 10 is a timing chart for illustrating an exemplary operation in a first light control mode.
Figure 11:
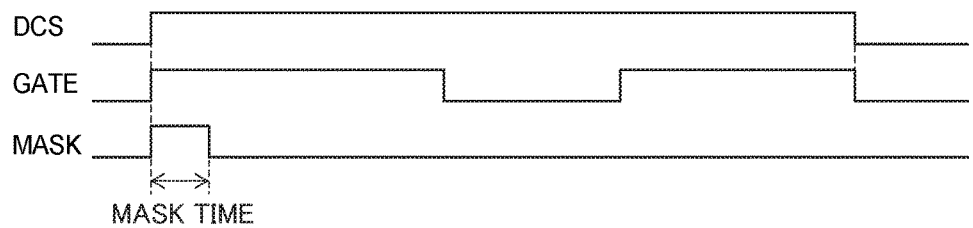
FIG. 11 is a timing chart for illustrating an exemplary operation in a second light control mode.
Figure 12:
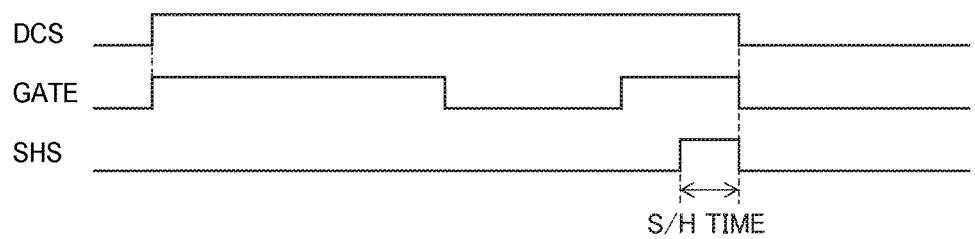
FIG. 12 is a timing chart for illustrating an exemplary operation in a third light control mode.
Figure 13:
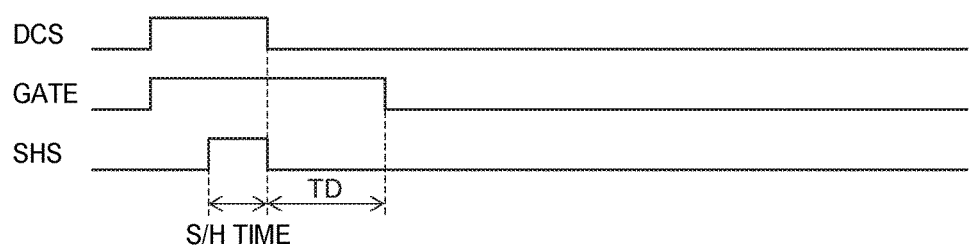
FIG. 13 is a timing chart for illustrating an exemplary operation in a fourth light control mode.

FIGS. 10 to 13 are timing charts for illustrating exemplary operations in the first to fourth light control modes, respectively. As shown in FIG. 10, in the first light control mode, the digital light control signal DCS is always activated to a high level, and analog light control is performed by the second control signal GATE being activated to a high level and deactivated to a low level. On the other hand, as shown in FIGS. 11 to 13, in the second to fourth light control modes, the digital light control signal DCS is also activated to a high level and deactivated to a low level, and both analog light control and digital light control are performed.

As shown in FIGS. 11 and 12, in the second and third light control modes, the second control signal GATE is activated to a high level in synchronization with rise of the digital light control signal DCS. Also, the second control signal GATE is forcefully deactivated to a low level in synchronization with fall of the digital light control signal DCS.

As shown in FIG. 13, in the fourth light control mode, the second control signal GATE is activated to a high level in synchronization with rise of the digital light control signal DCS. On the other hand, in terms of the deactivation of the second control signal GATE, the second control signal GATE is not synchronized with fall of the digital light control signal DCS, and is maintained in an activated state during the delay time TD (a predetermined period) after fall of the digital light control signal DCS, and then deactivated to a low level.

Note that as shown in FIG. 11, in the second light control mode, the condition setting circuit 58 may generate a mask signal MASK that is activated during a predetermined mask period (MASK TIME) immediately after the digital light control signal DCS transitioned to an activated state. The mask signal MASK is used for turning off the switch circuit 74. Accordingly, it is possible to avoid the influence of a measurement error caused by the operation speed of the current sense amplifier 72 being low.

In addition, as shown in FIGS. 12 and 13, in the third and fourth light control modes, the condition setting circuit 58 may generate a sample hold signal SHS that is activated during a predetermined sample hold period (S/H TIME) immediately before the digital light control signal DCS transits to a deactivated state.

The sample hold signal SHS is used for causing the sample hold circuit 76 to perform a sample hold operation. Accordingly, the sample hold circuit 76 can perform the sample hold operation after a current that flows to the light-emitting element 110 is stabilized. Alternatively, the sample hold signal SHS may be supplied from an external microcomputer or the like to the light emission control circuit 100 (FIG. 8).

In this manner, if the on-duty ratio of the first control signal DDRV is smaller than a predetermined value (in this example, 5%), the switching control circuit 50a maintains the second control signal GATE in an activated state during a predetermined period after the first control signal DDRV transits from an activated state to a deactivated state. That makes it possible to extend a period during which the transistor QN1 is in an on-state by the predetermined period after the first control signal DDRV is deactivated, and continuously increase energy that is accumulated in the inductor L1.

At this time, if the on-duty ratio of the first control signal DDRV is smaller than the predetermined value, and the second control signal GATE has never been deactivated during a period during which the first control signal DDRV is activated, the switching control circuit 50a may maintain the second control signal GATE in an activated state during the predetermined period. Accordingly, only in a case where the second control signal GATE is activated as a single pulse during the period during which the first control signal DDRV is activated, the pulse width of the second control signal GATE can be extended.

Therefore, for example, in a case where the comparison result signal COMP has ever been at a high level during a period during which the digital light control signal DCS is activated, the condition setting circuit 58 activates the selection signal SEL3, and deactivates the selection signal SEL4. That state is cancelled when the digital light control signal DCS is activated next time.

Second Exemplary Operation

In a second exemplary operation, even if information regarding the on-duty ratio of the digital light control signal DCS is not supplied from outside, the condition setting circuit 58 can set a condition for deactivating the second control signal GATE. For example, the condition setting circuit 58 generates the selection signals SEL1 to SEL4 based on the digital light control signal DCS and the comparison result signal COMP that is output from the comparator 75.

In a case where the comparison result signal COMP has ever been at a high level during a period during which the digital light control signal DCS is activated, the condition setting circuit 58 determines that the on-duty ratio of the first control signal DDRV is larger than or equal to a predetermined value, and activates the selection signals SEL1 and SEL3, and deactivates the selection signals SEL2 and SEL4.

Accordingly, the switch circuit 78a enters an on-state, and the switch circuit 78b enters an off-state, and thus an output signal of the current sense amplifier 72 is supplied to the inverting input terminal of the operational amplifier 73. In addition, the switch circuit 55 enters an on-state, and the switch circuit 56 enters an off-state, and thus an output signal of the inverter 53 is supplied to one input terminal of the OR circuit 57. The comparison result signal COMP that is output from the comparator 75 is supplied to the other input terminal of the OR circuit 57.

When the digital light control signal DCS is deactivated to a low level, or when the voltage of the detection signal DET rises above the voltage of the error signal ERR and the comparison result signal COMP is set to a high level, the OR circuit 57 generates a high-level output signal. Accordingly, the RS flip flop 51 is reset, and the second control signal GATE is deactivated. Therefore, if the on-duty ratio of the first control signal DDRV is larger than or equal to the predetermined value, the second control signal GATE is maintained in a deactivated state during a period during which the first control signal DDRV is deactivated.

On the other hand, in a case where the comparison result signal COMP has never been activated during a period during which the digital light control signal DCS is activated, the condition setting circuit 58 determines that the on-duty ratio of the first control signal DDRV is smaller than the predetermined value, deactivates the selection signals SEL1 and SEL3, and activates the selection signals SEL2 and SEL4.

Accordingly, the switch circuit 78a enters an off-state, and the switch circuit 78b enters an on-state, and thus an output signal of the current sense amplifier 77 is supplied to the inverting input terminal of the operational amplifier 73. In addition, the switch circuit 55 enters an off-state, and the switch circuit 56 enters an on-state, and an output signal of the AND circuit 52 is supplied to one input terminal of the OR circuit 57. The comparison result signal COMP that is output from the comparator 75 is supplied to the other input terminal of the OR circuit 57.

When the delay time TD has elapsed after the digital light control signal DCS was deactivated to a low level, or when the voltage of the detection signal DET rises above the voltage of the error signal ERR and the comparison result signal COMP is set to a high level, the OR circuit 57 generate a high-level output signal. Accordingly, the RS flip flop 51 is reset, and the second control signal GATE is deactivated. Therefore, if the on-duty ratio of the first control signal DDRV is smaller than the predetermined value, the second control signal GATE is maintained in an activated state during a portion of a period during which the first control signal DDRV is deactivated.

Note that a current that flows to the inductor L1 (FIG. 8) gradually increases after the transistor QN1 enters an on-state, and thus if the on-duty ratio of the first control signal DDRV is small, the comparison result signal COMP that is output from the comparator 75 is kept at a low level before and after the timing when the first control signal DDRV is deactivated.

Fourth Embodiment

Figure 14:
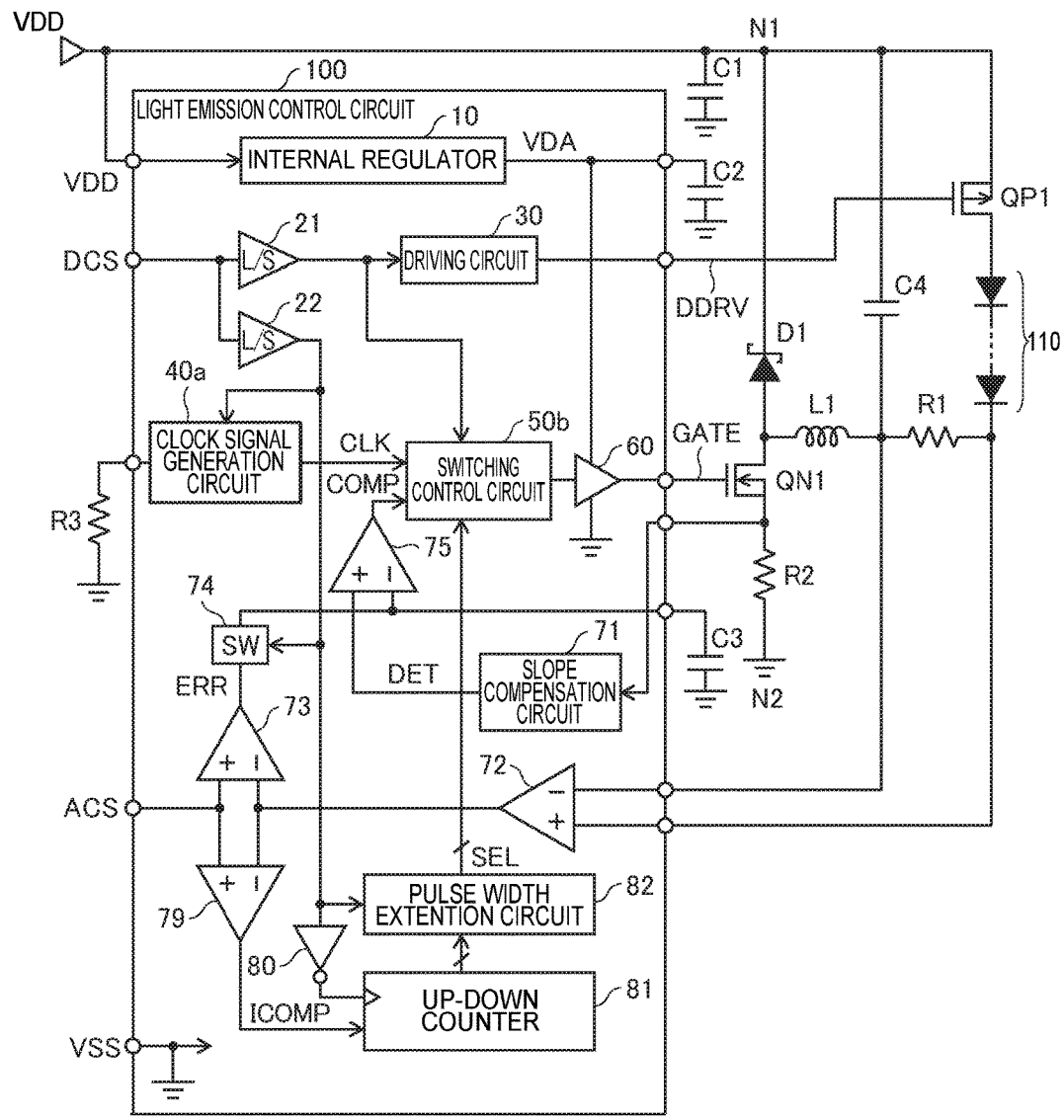
FIG. 14 is a circuit diagram of a light source apparatus that has a light emission control circuit according to a fourth embodiment of the invention.

FIG. 14 is a circuit diagram showing a configuration example of a light source apparatus that has a light emission control circuit according to a fourth embodiment of the invention. In the fourth embodiment, a switching control circuit 50b is used in place of the switching control circuit 50 in the second embodiment shown in FIG. 4. Also, a comparator 79, an inverter 80, an up-down counter 81, and a pulse width extension circuit 82 are added. In the other respects, the fourth embodiment may be similar to the second embodiment.

A slope compensation circuit 71 adds a bias voltage to the voltage between the two ends of a resistor R2 for current detection so as to generate a detection signal DET, and supplies the detection signal DET to a non-inverting input terminal of a comparator 75. A current sense amplifier 72 amplifies the voltage between the two ends of a resistor R1 that is in proportion to a current that flows to a light-emitting element 110 (a current detection voltage), so as to generate an output signal. The comparator 75 compares the voltage of the detection signal DET that is supplied from the slope compensation circuit 71 with the voltage of an error signal ERR, so as to generate a comparison result signal COMP that is based on the comparison result, and supplies the comparison result signal COMP to the switching control circuit 50b.

The comparator 79 compares the voltage of an output signal of the current sense amplifier 72 with the voltage of an analog light control signal ACS so as to generate an output signal ICOMP that is based on the comparison result. The output signal ICOMP of the comparator 79 is set to a high level if a current that flows to the light-emitting element 110 is smaller than a predetermined value, and is set to a low level if a current that flows to the light-emitting element 110 is larger than the predetermined value. Note that a certain amount of response time is required for the output voltage of the current sense amplifier 72 and the output level of the comparator 79 to change, and thus the previous state is maintained at a time point when a digital light control signal DCS falls. The output signal ICOMP of the comparator 79 is supplied to the up-down counter 81.

The inverter 80 inverts the digital light control signal DCS that is supplied from a level shifter 22, and supplies the inverted digital light control signal DCS to the up-down counter 81. The up-down counter 81 performs a count-up operation or a count-down operation in synchronization with fall of the digital light control signal DCS in accordance with the output signal ICOMP of the comparator 79.

For example, when the power supply is on, the count value of the up-down counter 81 is reset to the initial value. The up-down counter 81 increments the count value in synchronization with fall of the digital light control signal DCS when the output signal ICOMP of the comparator 79 is at a high level, and decrements the count value when the output signal ICOMP of the comparator 79 is at a low level.

For example, the pulse width extension circuit 82 is constituted by a logic circuit that includes a combinational circuit or a sequential circuit, generates a selection signal SEL used for selecting an activation period (a pulse width) of a second control signal GATE based on the count value of the up-down counter 81, and outputs the selection signal SEL to the switching control circuit 50b.

The switching control circuit 50b activates or deactivates the second control signal GATE based on a clock signal CLK, the comparison result signal COMP, the selection signal SEL, and the digital light control signal DCS that is supplied from a level shifter 21, in order to bring a transistor QN1 into an on-state or an off-state.

Figure 15:
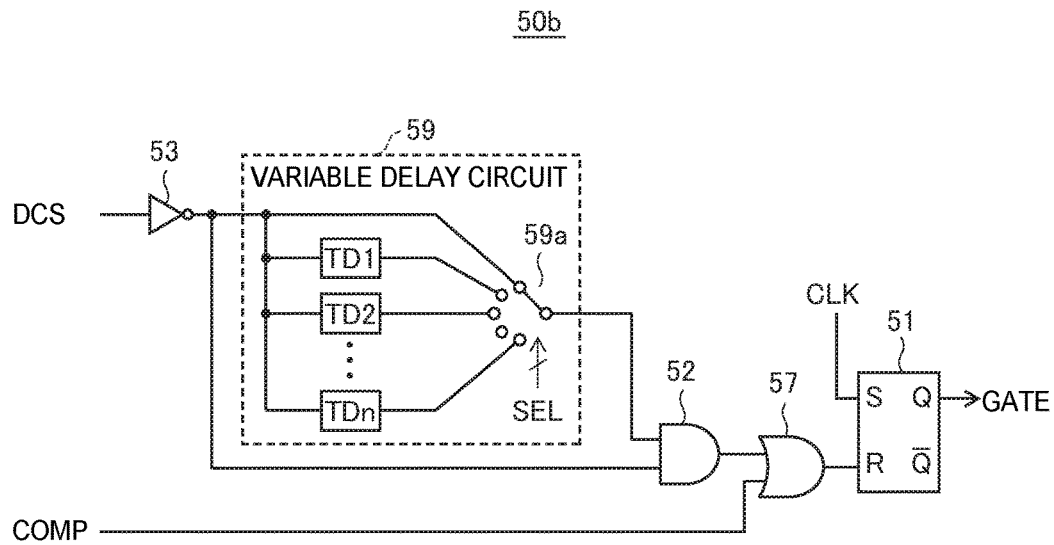
FIG. 15 is a circuit diagram showing a configuration example of the switching control circuit shown in FIG. 14.

FIG. 15 is a circuit diagram showing a configuration example of the switching control circuit shown in FIG. 14. In this example, the switching control circuit 50b includes an RS flip flop 51, an AND circuit 52, an inverter 53, an OR circuit 57, and a variable delay circuit 59.

When an output signal of the OR circuit 57 is at a low level, the RS flip flop 51 is set in synchronization with rise of the clock signal CLK, and activates the second control signal GATE to a high level, and when the clock signal CLK is at a low level, the RS flip flop 51 is reset in synchronization with rise of an output signal of the OR circuit 57, and deactivates the second control signal GATE to a low level.

The inverter 53 inverts the digital light control signal DCS so as to generate an output signal, and supplies the output signal to the variable delay circuit 59. The variable delay circuit 59 includes a plurality of delay circuits to which output signals of the inverter 53 are supplied in parallel, and a selection circuit 59a for selecting one signal from an output signal of the inverter 53 and output signals of the delay circuits. For example, each of the delay circuits is constituted by a plurality of delay elements such as inverters that cause a gate delay, or a resistor, a capacitor, and the like, and the selection circuit 59a is constituted by a plurality of analog switches and the like.

The delay circuits have delay times TD1, TD2, . . . , TDn that are different from each other, and delay the digital light control signal DCS inverted by the inverter 53. In addition, the selection circuit 59a selects the delay time TD of the digital light control signal DCS inverted by the inverter 53, in accordance with the selection signal SEL supplied from the pulse width extension circuit 82 (FIG. 14).

The AND circuit 52 generate an output signal by obtaining the logical product of an output signal of the inverter 53 and an output signal of the variable delay circuit 59. The output signal of the AND circuit 52 is set to a low level at the time when the digital light control signal DCS is activated, and is set to a high level at the time when the delay time TD has elapsed after the digital light control signal DCS was deactivated (TD≥0).

The OR circuit 57 generates an output signal by obtaining the logical sum of an output signal of the AND circuit 52 and the comparison result signal COMP that is output from the comparator 75 (FIG. 14). The output signal of the OR circuit 57 is supplied to a reset terminal of the RS flip flop 51. When an output signal of the AND circuit 52 is set to a high level, or when the voltage of the detection signal DET rises above the voltage of the error signal ERR and the comparison result signal COMP is set to a high level, the OR circuit 57 generates a high-level output signal. Accordingly, the RS flip flop 51 is reset, and deactivates the second control signal GATE.

Exemplary Operation

Figure 16:
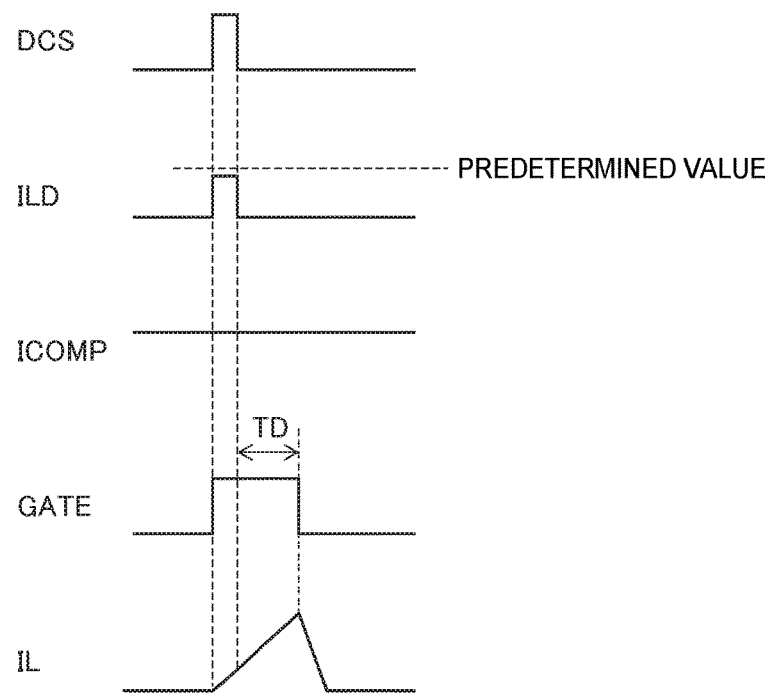
FIG. 16 is a waveform diagram for illustrating an exemplary operation of the light emission control circuit shown in FIG. 14.

An exemplary operation of the light emission control circuit according to the fourth embodiment of the invention will be described with reference to FIGS. 14 to 16. FIG. 16 is a waveform diagram for illustrating an exemplary operation of the light emission control circuit shown in FIG. 14.

When the digital light control signal DCS is activated to a high level, a first control signal DDRV is activated to a low level, a transistor QP1 enters an on-state, and a current ILD flows to the light-emitting element 110. The switching control circuit 50b activates or deactivates the second control signal GATE in order to bring the transistor QN1 into an on-state or an off-state, during a period during which the first control signal DDRV is activated.

When the second control signal GATE is activated to a high level in synchronization with activation of the digital light control signal DCS, the transistor QN1 enters an on-state, and a current IL flows to the inductor L1. The current IL that flows to the inductor L1 gradually increases over time. During the period shown in FIG. 16, the current IL that flows to the inductor L1 is small, and thus the comparison result signal COMP that is output from the comparator 75 is at a low level.

As shown in FIG. 16, if the current ILD that flows to the light-emitting element 110 when the first control signal DDRV is activated is smaller than a predetermined value, the output signal ICOMP of the comparator 79 is set to a high level, and the up-down counter 81 is set to an count-up mode.

After that, when the digital light control signal DCS is deactivated to a low level, the first control signal DDRV is deactivated to a high level, the transistor QP1 enters an off-state, and the current ILD to the light-emitting element 110 stops. In addition, the up-down counter 81 increments the count value in synchronization with fall of the digital light control signal DCS, and thus the count value of the up-down counter 81 increases above the previous value.

The pulse width extension circuit 82 outputs, to the switching control circuit 50b, the selection signal SEL for selecting an output signal of the delay circuit having the delay time TD that is based on the difference between the count value and the initial value. In the switching control circuit 50b, the selection circuit 59a selects the output signal of the delay circuit having the delay time TD that has increased. Accordingly, after the delay time TD has elapsed since the digital light control signal DCS was deactivated, an output signal of the AND circuit 52 is set to a high level, and an output signal of the OR circuit 57 is set to a high level, and the RS flip flop 51 deactivates the second control signal GATE.

Here, a period during which an output signal of the AND circuit 52 is at a high level corresponds to a period during which activation of the second control signal GATE for analog light control is inhibited. Therefore, when the delay time TD increases, the period during which activation of the second control signal GATE for analog light control is inhibited in a period during which the first control signal DDRV for digital light control is deactivated is shortened.

When the second control signal GATE is deactivated to a low level, the transistor QN1 enters an off-state, and the current IL that flows to the inductor L1 decreases. By repeating such an operation every time the digital light control signal DCS is activated and deactivated, the pulse width of the second control signal GATE increases gradually.

Next, if the current ILD that flows to the light-emitting element 110 when the digital light control signal DCS is activated to a high level exceeds the predetermined value, the output signal ICOMP of the comparator 79 is set to a low level, and the up-down counter 81 is set to a count-down mode.

When the digital light control signal DCS is deactivated to a low level, the first control signal DDRV is deactivated to a high level, the transistor QP1 enters an off-state, and the current ILD to the light-emitting element 110 stops. Also, the up-down counter 81 decrements the count value in synchronization with fall of the digital light control signal DCS, and thus the count value decreases below the previous value.

The pulse width extension circuit 82 outputs, to the switching control circuit 50b, the selection signal SEL for selecting an output signal of the delay circuit having the delay time TD that is based on the difference between the count value and the initial value. In the switching control circuit 50b, the selection circuit 59a selects the output signal of the delay circuit having the delay time TD that has decreased. Accordingly, after the delay time TD has elapsed since the digital light control signal DCS was deactivated, the second control signal GATE is deactivated to a low level.

In a case where the count value of the up-down counter 81 became smaller than or equal to a lower limit value, the pulse width extension circuit 82 outputs the selection signal SEL for selecting an output signal of the inverter 53 to the switching control circuit 50b. In the switching control circuit 50b, the selection circuit 59a selects the output signal of the inverter 53. Accordingly, when the digital light control signal DCS is deactivated, the second control signal GATE is deactivated to a low level.

Here, a period during which an output signal of the AND circuit 52 is at a high level corresponds to a period during which activation of the second control signal GATE for analog light control is inhibited. Therefore, when the delay time TD decreases, the period during which activation of the second control signal GATE for analog light control is inhibited in a period during which the first control signal DDRV for digital light control is deactivated is extended. This period is extended to be equal to the deactivation period of the first control signal DDRV at most.

When the second control signal GATE is deactivated to a low level, the transistor QN1 enters an off-state, and the current IL that flows to the inductor L1 decreases. By repeating increase and decrease in the pulse width of the second control signal GATE every time the digital light control signal DCS is activated and deactivated, the pulse width of the second control signal GATE is settled at an appropriate value.

In this manner, according to the fourth embodiment, if a current that flows to the light-emitting element 110 when the first control signal DDRV for digital light control is activated is smaller than the predetermined value, the period during which activation of the second control signal GATE for analog light control is inhibited in a period during which the first control signal DDRV is deactivated is shortened. Accordingly, even in a case where a period during which a current is caused to flow to the light-emitting element 110 in digital light control is short, it is possible to accumulate energy in the inductor L1 so as to prevent reduction of a current that flows to the light-emitting element 110 below a current instructed in analog light control.

In addition, if a current that flows to the light-emitting element 110 when the first control signal DDRV for digital light control is activated is larger than the predetermined value, the period during which activation of the second control signal GATE for analog light control is inhibited in the period during which the first control signal DDRV is deactivated is extended. Accordingly, in a case of performing both analog light control and digital light control, it is possible to suppress discharge of energy accumulated in the inductor L1 without being used for light emission, and reduce power loss.

Modified Example of Fourth Embodiment

Similarly to the light emission control circuit 100 shown in FIG. 8, the light emission control circuit 100 shown in FIG. 14 may include a sample hold circuit 76 that samples and holds a current detection voltage that is in proportion to a current that flows to the light-emitting element 110 when the first control signal DDRV is activated, and the current sense amplifier 77 that amplifies the current detection voltage held in the sample hold circuit 76, and generates an output signal. In that case, the output signal of the current sense amplifier 77 is supplied to the inverting input terminal of the comparator 79.

Fifth Embodiment

In a fifth embodiment of the invention, the switching control circuit 50a in the third embodiment shown in FIG. 9 includes a variable delay circuit 59 shown in FIG. 15. Accordingly, a period during which the pulse width of a second control signal GATE is extended can be variable. In the other respects, the fifth embodiment may be similar to the third embodiment.

If the on-duty ratio of a first control signal DDRV is larger than or equal to a predetermined value, a switching control circuit 50a maintains the second control signal GATE in a deactivated state during a period during which the first control signal DDRV is deactivated, and if the on-duty ratio of the first control signal DDRV is smaller than the predetermined value, the switching control circuit 50a maintains the second control signal GATE in an activated state during a predetermined period after the first control signal DDRV transits from an activated state to a deactivated state.

In that case, a configuration may be adopted in which, if the on-duty ratio of the first control signal DDRV is a first value, the switching control circuit 50a sets the predetermined period to a first period, and if the on-duty ratio of the first control signal DDRV is a second value that is smaller than the first value, the switching control circuit 50a sets the predetermined period to a second period that is longer than the first period. That makes it possible to further increase energy that is accumulated in an inductor L1 if a period during which a current is caused to flaw to a light-emitting element 110 in digital light control is shorter.

For example, five types of light control modes are set according to the on-duty ratio of the first control signal DDRV, and information for specifying the current light control mode is supplied to a condition setting circuit 58. In a light control mode in which the on-duty ratio of the first control signal DDRV is larger than or equal to 5%, the condition setting circuit 58 sets the predetermined period to 0, and in a light control mode in which the on-duty ratio of the first control signal DDRV is 4%, the condition setting circuit 58 sets the predetermined period to TA1 (TA1>0).

In addition, in a light control mode in which the on-duty ratio of the first control signal DDRV is 3%, the condition setting circuit 58 sets the predetermined period to TA2 (TA2>TA1), in a light control mode in which the on-duty ratio of the first control signal DDRV is 2%, the condition setting circuit 58 sets the predetermined period to TA3 (TA3>TA2), and in a light control mode in which the on-duty ratio of the first control signal DDRV is 1%, the condition setting circuit 58 sets the predetermined period to TA4 (TA4>TA3).

Furthermore, the light emission control circuit 100 shown in FIG. 8 may include circuits from a comparator 79 to a pulse width extension circuit 82 shown in FIG. 14. In that case, the switching control circuit 50a may adjust the predetermined period in accordance with a selection signal SEL that is supplied from the pulse width extension circuit 82, according to a current that flows to the light-emitting element 110. Accordingly, if a current that flows to the light-emitting element 110 is smaller, it is possible to further increase energy that is accumulated in the inductor L1.

For example, if a current that flows to the light-emitting element 110 when the first control signal DDRV is activated is smaller than a predetermined value, the up-down counter 81 increments the count value every time a digital light control signal DCS is activated and deactivated, and thus the difference between the count value and the initial value increases gradually. The pulse width extension circuit 82 successively generates selection signals SEL for selecting an output signal of a delay circuit having a delay time TD that is based on the difference between the count value and the initial value, and supplies the selection signals SEL to the switching control circuit 50a.

In the variable delay circuit 59 (FIG. 15) provided in the switching control circuit 50a, a selection circuit 59a successively selects output signals of the delay circuit having the delay time TD that gradually increases, in accordance with the selection signals SEL. Accordingly, the extension period of the pulse width of the second control signal GATE increases gradually.

Alternatively, if the on-duty ratio of the first control signal DDRV is smaller than the predetermined value, if a current that flows to the light-emitting element 110 when the first control signal DDRV is activated is smaller than the predetermined value, the switching control circuit 50a may extend, by a first period, a period during which the second control signal GATE is maintained in an activated state after the first control signal DDRV transits from an activated state to a deactivated state, and if the current that flows to the light-emitting element 110 when the first control signal DDRV is activated is larger than the predetermined value, the switching control circuit 50a may shorten, by a second period, the period during which the second control signal GATE is maintained in an activated state after the first control signal DDRV transits from an activated state to a deactivated state.

In that case, it is desirable that the second period is longer than the first period. For example, in a case where the on-duty ratio of the first control signal DDRV changes from the first value (e.g., 1%) to the second value (e.g., 2%) that is larger than the first value, if the second control signal GATE is generated in accordance with an extension period that was set when the on-duty ratio was the first value, a current that flows to the light-emitting element 110 becomes excessive. In view of this, when an extension period is set next time, an excessive current can be resolved at an early stage by shortening the extension period by the second period that is longer than the first period. For example, the second period may be twice the first period.

Sixth Embodiment

Figure 17:
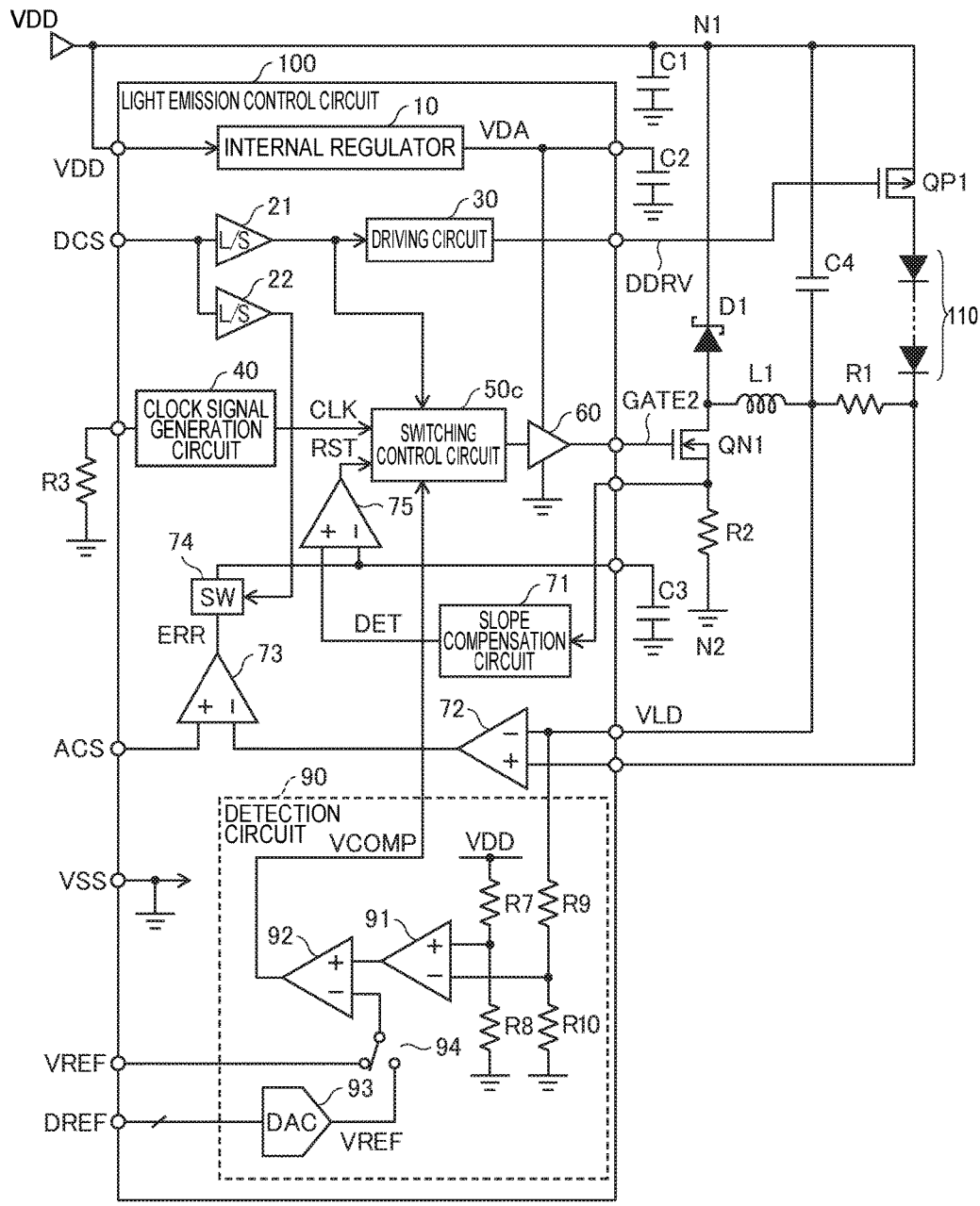
FIG. 17 is a circuit diagram of a light source apparatus that has a light emission control circuit according to a sixth embodiment of the invention.

FIG. 17 is a circuit diagram showing a configuration example of a light source apparatus that has a light emission control circuit according to a sixth embodiment of the invention. In the sixth embodiment, in place of the switching control circuit 50 shown in FIG. 1 or 4, a switching control circuit 50c is used. In addition, a detection circuit 90 that compares the potential difference between the two ends of a light-emitting element 110 with a reference voltage VREF is added. In the other respects, the sixth embodiment may be similar to the first or second embodiment.

As shown in FIG. 17, the detection circuit 90 includes resistors R7 to R10, an operational amplifier 91, and a comparator 92, and may further includes DAC 93 and a switch circuit 94. The resistors R7 and R8 constitute a first voltage dividing circuit that divides a power supply potential VDD. The resistors R9 and R10 constitute a second voltage dividing circuit that divides a detection potential VLD at the connection point between a capacitor C4 and an inductor L1. The voltage dividing ratio of the first voltage dividing circuit and the voltage dividing ratio of the second voltage dividing circuit may be equal.

Accordingly, the first and second voltage dividing circuits divide the potential difference between the two ends of the capacitor C4 by a predetermined voltage dividing ratio, and for example, the operational amplifier 91 that operates when power supply potentials of 5 V and 0 V are supplied amplifies the divided potential difference at a predetermined amplification factor. A transistor QP1 cyclically enters an on-state in accordance with a first control signal DDRV, and thus the potential difference between the two ends of the capacitor C4 is then substantially equal to the potential difference between the two ends of the light-emitting element 110.

The comparator 92 compares an output voltage of the operational amplifier 91 with the reference voltage VREF, and thereby generates an output signal VCOMP that is based on the comparison result. In this manner, if the potential difference between the two ends of the light-emitting element 110 is smaller than a predetermined value, the detection circuit 90 deactivates the output signal VCOMP to a low level, and if the potential difference between the two ends of the light-emitting element 110 is larger than the predetermined value, the detection circuit 90 activates the output signal VCOMP to a high level.

An external microcomputer or the like may supply, to the detection circuit 90, the reference voltage VREF that is used for detecting whether the potential difference between the two ends of the light-emitting element 110 is smaller or larger than the predetermined value. Alternatively, the detection circuit 90 may receive information (data) DREF regarding the reference voltage VREF from an external microcomputer or the like. DAC 93 converts the data DREF that is supplied from outside, into the reference voltage VREF.

In that case, even if the voltage-current property of the light-emitting element 110 changes due to a temperature, a change due to a temperature can be compensated by setting the reference voltage VREF that is based on a temperature, from a microcomputer or the like that has temperature information of the light source apparatus. Furthermore, a configuration may be adopted in which the switch circuit 94 is provided, and one of the reference voltage VREF that is supplied from outside and the reference voltage VREF that is supplied from DAC 93 can be selected. The output signal VCOMP of the detection circuit 90 is supplied to the switching control circuit 50c.

The switching control circuit 50c activates or deactivates a second control signal GATE based on a clock signal CLK, a reset signal RST, the output signal VCOMP of the detection circuit 90, and a digital light control signal DCS that is supplied from a level shifter 21, in order to bring a transistor QN1 into an on-state or an off-state.

Figure 18:
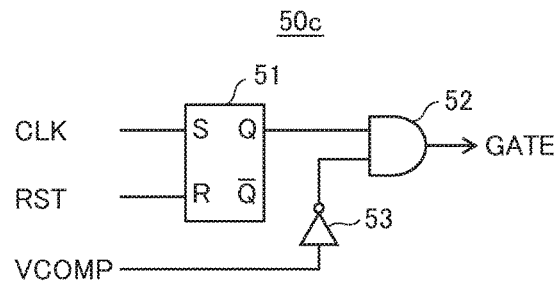
FIG. 18 is a circuit diagram showing a configuration example of the switching control circuit shown in FIG. 17.

FIG. 18 is a circuit diagram showing a configuration example of the switching control circuit shown in FIG. 17. In this example, the switching control circuit 50c includes an RS flip flop 51, an AND circuit 52, and an inverter 53.

The RS flip flop 51 activates an output signal to a high level in synchronization with the clock signal CLK, and deactivates the output signal in synchronization with the reset signal RST that is generated based on a current that flows through the transistor QN1 and a current that flows through the light-emitting element 110. The AND circuit 52 corresponds to a mask circuit that masks an output signal of the RS flip flop 51 in accordance with the output signal VCOMP of the detection circuit 90.

In a case of stopping the RS flip flop 51 or the circuits of the feedback group in order to mask an output signal of the RS flip flop 51, restoration of the second control signal GATE takes time, but in a case of masking an output signal of the RS flip flop 51, a time required for restoring the second control signal GATE can be shortened.

The inverter 53 inverts the output signal VCOMP of the detection circuit 90, and supplies the inverted output signal VCOMP to the AND circuit 52. In a case where the output signal VCOMP of the detection circuit 90 is deactivated to a low level and an output signal of the inverter 53 is at a high level, the AND circuit 52 outputs an output signal of the RS flip flop 51 as the second control signal GATE, and in a case where the output signal VCOMP of the detection circuit 90 is activated to a high level and an output signal of the inverter 53 is at a low level, the AND circuit 52 maintains the second control signal GATE in an activated state.

Exemplary Operation

Figure 19:
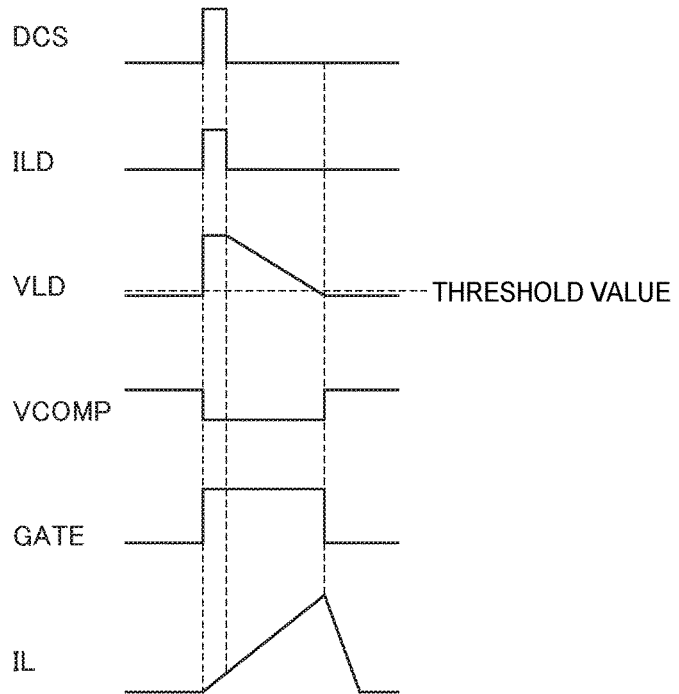
FIG. 19 is a waveform diagram for illustrating an exemplary operation of the light emission control circuit shown in FIG. 17.

An exemplary operation of the light emission control circuit according to the sixth embodiment of the invention will be described with reference to FIGS. 17 to 19. FIG. 19 is a waveform diagram for illustrating an exemplary operation of the light emission control circuit shown in FIG. 17. FIG. 19 shows a case where the on-duty ratio of a digital light control signal (the on-duty ratio of the first control signal DDRV) is smaller than a predetermined value.

When the digital light control signal DCS is activated to a high level, the first control signal DDRV is activated to a low level, the transistor QP1 enters an on-state, and a current ILD flows to the light-emitting element 110. Accordingly, when the detection potential VLD rises above a threshold and the potential difference between the two ends of the light-emitting element 110 becomes smaller than a predetermined value, the output signal VCOMP of the detection circuit 90 is deactivated to a low level.

When the output signal VCOMP of the detection circuit 90 is deactivated to a low level, the AND circuit 52 outputs an output signal of the RS flip flop 51 as the second control signal GATE. Accordingly, if the potential difference between the two ends of the light-emitting element 110 is smaller than the predetermined value, the switching control circuit 50c activates the second control signal GATE during at least a portion of the period in order to bring the transistor QN1 into an on-state.

When the second control signal GATE is activated to a high level, the transistor QN1 enters an on-state, and a current IL flows to the inductor L1. The current IL that flows to the inductor L1 gradually increases over time. During the period shown in FIG. 19, the current IL that flows to the inductor L1 is small, and thus the reset signal RST that is output from the comparator 75 is at a low level.

After that, when the digital light control signal DCS is deactivated to a low level, the first control signal DDRV is deactivated to a high level, the transistor QP1 enters an off-state, and the current ILD to the light-emitting element 110 stops. Accordingly, a current is not supplied from the light-emitting element 110 to the inductor L1 any longer, and thus the detection potential VLD falls gradually. When the detection potential VLD falls below a threshold and the potential difference between the two ends of the light-emitting element 110 exceeds the predetermined value, the output signal VCOMP of the detection circuit 90 is activated to a high level.

When the output signal VCOMP of the detection circuit 90 is activated to a high level, the AND circuit 52 deactivates an output signal to a low level. Accordingly, if the potential difference between the two ends of the light-emitting element 110 is larger than the predetermined value, the switching control circuit 50c maintains the second control signal GATE in a deactivated state in order to bring the transistor QN1 into an off-state.

When the second control signal GATE is deactivated to a low level, the transistor QN1 enters an off-state, the current IL that flows to the inductor L1 decreases, and fall of the detection potential VLD stops. In this manner, the switching control circuit 50c adjusts activation and deactivation of the second control signal GATE such that the potential difference between the two ends of the light-emitting element 110 approaches the predetermined value.

Although not shown in FIG. 19, if the on-duty ratio of the digital light control signal DCS is larger than or equal to a predetermined value, there are cases where the reset signal RST is activated before the output signal VCOMP of the detection circuit 90 is activated. In that case, the switching control circuit 50c deactivates the second control signal GATE in synchronization with activation of the reset signal RST. Furthermore, there are cases where the switching control circuit 50c repeats activation and deactivation of the second control signal GATE in synchronization with the clock signal CLK and the reset signal RST.

According to the sixth embodiment, if the potential difference between the two ends of the light-emitting element 110 is larger than the predetermined value, the transistor QN1 is maintained in an off-state by maintaining the second control signal GATE for analog light control in a deactivated state. Accordingly, in a case of performing both analog light control and digital light control, even if the first control signal DDRV for digital light control is deactivated and the transistor QP1 enters an off-state, it is possible to suppress discharge of energy accumulated in the inductor L1 without being used for light emission, and reduce power loss.

In addition, if the potential difference between the two ends of the light-emitting element 110 is smaller than the predetermined value, the transistor QN1 enters an on-state by activating the second control signal GATE for analog light control during at least a portion of the period. Accordingly, even if a period during which a current is caused to flow to the light-emitting element 110 in digital light control is short, it is possible to accumulate energy in the inductor L1, and prevent reduction of a current that flows to the light-emitting element 110 below a current instructed in analog light control.

Seventh Embodiment

Figure 20:
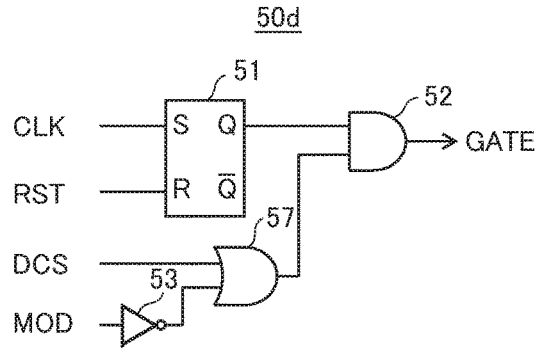
FIG. 20 is a circuit diagram showing a configuration example of a switching control circuit in a seventh embodiment.

FIG. 20 is a circuit diagram showing a configuration example of a switching control circuit of a seventh embodiment of the invention. In the seventh embodiment, a switching control circuit 50d shown in FIG. 20 is used in place of the switching control circuit 50c in the sixth embodiment shown in FIG. 17. In the other respects, the seventh embodiment may be similar to the sixth embodiment.

A light emission control circuit 100 receives information regarding the on-duty ratio of a digital light control signal DCS, that is information regarding the on-duty ratio of a first control signal DDRV, from an external microcomputer or the like. Accordingly, the switching control circuit 50d can set a condition for activation or deactivation of a second control signal GATE based on the information regarding the on-duty ratio of the first control signal DDRV.

In the example shown in FIG. 20, the switching control circuit 50d includes an RS flip flop 51, an AND circuit 52, an inverter 53, and an OR circuit 57. In addition, a mode signal MOD that is set to a high level if the on-duty ratio of the first control signal DDRV is larger than or equal to a predetermined value, and is set to a low level if the on-duty ratio of the first control signal DDRV is smaller than the predetermined value is supplied to the switching control circuit 50d.

For example, two types of light control modes are set according to the on-duty ratio of the first control signal DDRV. In a first light control mode, the on-duty ratio of the first control signal DDRV is larger than or equal to 5% and smaller than or equal to 100%, in a second light control mode, the on-duty ratio of the first control signal DDRV is larger than 0% and smaller than 5%. In that case, the mode signal MOD is at a high level in the first light control mode, and is at a low level in the second light control mode.

When the reset signal RST is at a low level, the RS flip flop 51 is set in synchronization with rise of the clock signal CLK, and activates an output signal to a high level, and when the clock signal CLK is at a low level, the RS flip flop 51 is reset in synchronization with rise of the reset signal RST, and deactivates an output signal to a low level.

The inverter 53 inverts the mode signal MOD so as to generate an output signal. The OR circuit 57 generates an output signal by obtaining the logical sum of the digital light control signal DCS and the output signal of the inverter 53. The AND circuit 52 generates an output signal by obtaining the logical product of an output signal of the RS flip flop 51 and an output signal of the OR circuit 57.

If the on-duty ratio of the first control signal DDRV is larger than or equal to the predetermined value, the mode signal MOD is set to a high level, an output signal of the inverter 53 is set to a low level, and the OR circuit 57 supplies the digital light control signal DCS to one input terminal of the AND circuit 52. When the digital light control signal DCS is activated to a high level, the AND circuit 52 outputs an output signal of the RS flip flop 51 as the second control signal GATE, and when the digital light control signal DCS is deactivated to a low level, deactivates the output signal to a low level.

Accordingly, if the on-duty ratio of the first control signal DDRV is larger than or equal to the predetermined value, the switching control circuit 50*d* activates or deactivates the second control signal GATE in order to bring a transistor QN1 into an on-state or an off-state during a period during which the first control signal DDRV is activated, and maintains the second control signal GATE in a deactivated state during a period during which the first control signal DDRV is deactivated.

On the other hand, if the on-duty ratio of the first control signal DDRV is smaller than the predetermined value, the mode signal MOD is set to a low level, an output signal of the inverter 53 is set to a high level, and the OR circuit 57 supplies the high-level signal to one input terminal of the AND circuit 52. The AND circuit 52 outputs an output signal of the RS flip flop 51 as the second control signal GATE.

Accordingly, if the on-duty ratio of the first control signal DDRV is smaller than the predetermined value, the switching control circuit 50*d* activates or deactivates the second control signal GATE asynchronously with the first control signal DDRV. The transistor QN1 is in an on-state when the second control signal GATE is activated, and is in an off-state when the second control signal GATE is deactivated.

According to the seventh embodiment, if the on-duty ratio of the first control signal DDRV for digital light control is larger than or equal to the predetermined value, the transistor QN1 is maintained in an off-state by maintaining the second control signal GATE for analog light control in a deactivated state during a period during which the first control signal DDRV is deactivated. Accordingly, in a case of performing both analog light control and digital light control, it is possible to suppress discharge of energy accumulated in the inductor L1 without being used for light emission, and reduce power loss.

In addition, if the on-duty ratio of the first control signal DDRV for digital light control is smaller than the predetermined value, the transistor QN1 enters an on-state or an off-state asynchronously with the first control signal DDRV by activating or deactivating the second control signal GATE for analog light control asynchronously with the first control signal DDRV. Accordingly, even in a case where a period during which a current is caused to flow to the light-emitting element 110 in digital light control is short, it is possible to accumulate energy in the inductor L1, and prevent reduction of a current that flows to the light-emitting element 110 below a current instructed in analog light control.

Eighth Embodiment

In the light source apparatus that has been described above, an N-channel MOS transistor can also be used in place of the P-channel MOS transistor QP1 as the first switching element. As an example, a case will be described below in which an N-channel MOS transistor is used as the first switching element in the light source apparatus shown in FIG. 1.

Figure 21:
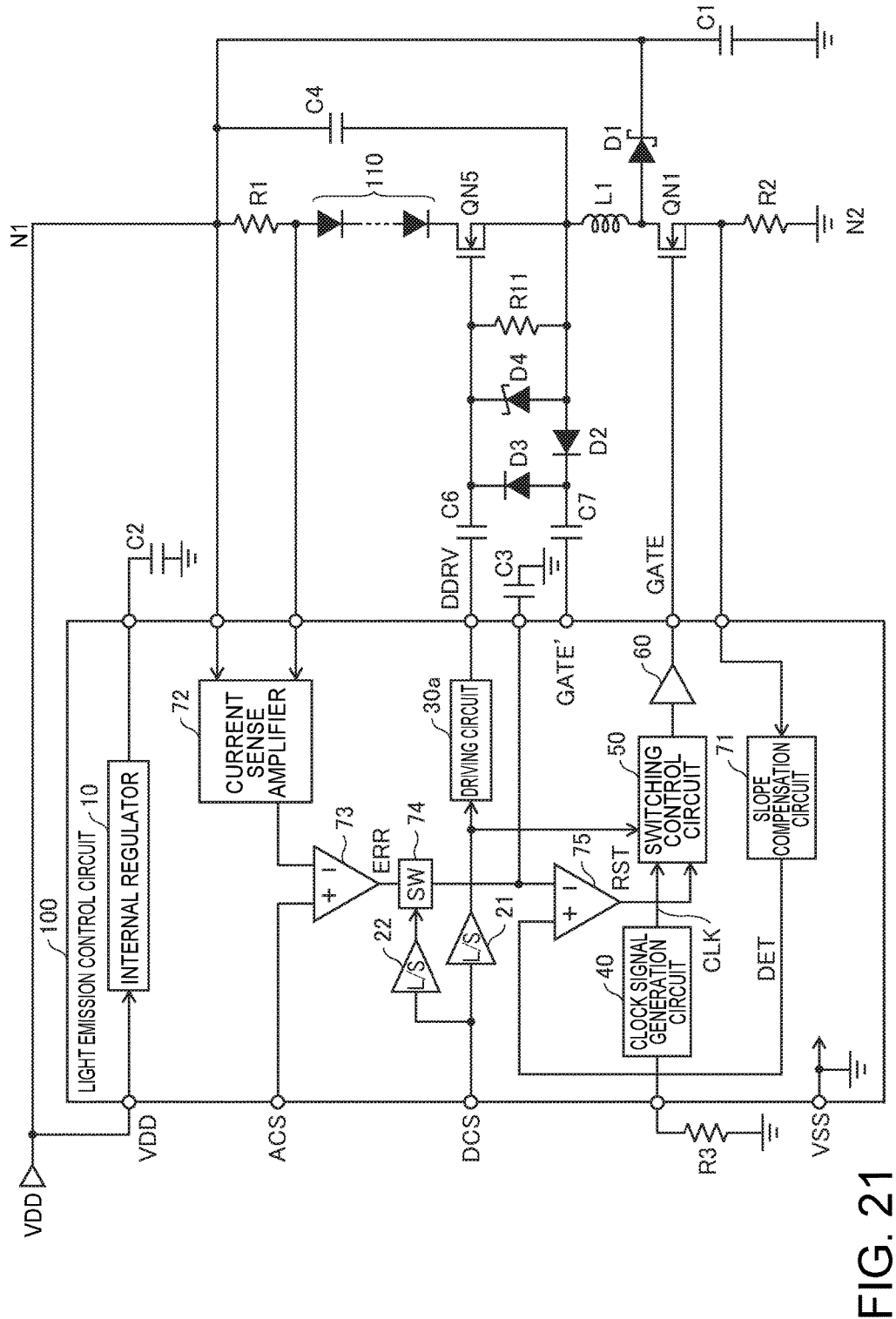
FIG. 21 is a circuit diagram of a light source apparatus that has a light emission control circuit according to an eighth embodiment of the invention.

FIG. 21 is a circuit diagram showing a configuration example of a light source apparatus that has a light emission control circuit according to the eighth embodiment of the invention. As shown in FIG. 21, in this light source apparatus, an N-channel MOS transistor QN5 is used as the first switching element, and diodes D2 and D3, a Zener diode D4, a resistor R11, capacitors C6 and C7 are added.

The transistor QN5 has a drain connected to a light-emitting element 110, a source connected to one end of an inductor L1, and a gate to which a first control signal DDRV is applied. A driving circuit 30*a* activates the first control signal DDRV to a high level in order to bring the transistor QN5 into an on-state, in accordance with a digital light control signal DCS, and deactivates the first control signal DDRV to a low level in order to bring the transistor QN5 into an off-state.

The first control signal DDRV and a second control signal GATE transit between a low level (e.g., 0 V) and a high level (e.g., 7.5 V). When the first control signal DDRV is activated to a high level, a current flows from the driving circuit 30*a* to the gate of the transistor QN5 via the capacitor C6, the voltage between the gate and the source of the transistor QN5 rises, and the transistor QN5 enters an on-state. The Zener diode D4 clamps such that the voltage between the gate and the source of the transistor QN5 does not exceed a predetermined voltage (e.g., 7.5 V).

A third control signal GATE' transits between a low level and a high level during a period during which the first control signal DDRV is maintained in an activated state. Accordingly, the capacitor C7 and the diodes D2 and D3 perform a rectifying operation, and thus the voltage between the gate and the source of the transistor QN5 is maintained at a threshold voltage or more. In the example shown in FIG. 21, the second control signal GATE is maintained in a deactivated state during a deactivation period of the first control signal DDRV, and thus the second control signal GATE can also be used as the third control signal GATE'.

On the other hand, in the sixth embodiment shown in FIG. 17, also during a deactivation period of the first control signal DDRV, the second control signal GATE can be activated and deactivated, and thus the third control signal GATE' that is different from the second control signal GATE is used. For example, by providing, in the switching control circuit 50, an AND circuit for obtaining the logical product of the digital light control signal DCS or the first control signal DDRV and the second control signal GATE, the third control signal GATE' is generated.

When the first control signal DDRV is deactivated to a low level, a current flows from the source of the transistor QN5 to the driving circuit 30*a* via the diodes D2 and D3 and the capacitor C6, the voltage between the gate and the source of the transistor QN5 falls, and the transistor QN5 enters an off-state. In a case where the light emission apparatus stops light emission for a long time at the time of stand-by or the like, the resistor R11 drops the voltage between the gate and the source of the transistor QN5, and maintains the transistor QN5 in an off-state.

According to the above embodiment, it is possible to provide a light source apparatus in which power loss is small and that can accurately control brightness by the light emission control circuit 100 suppressing discharge of energy accumulated in the inductor L1 without being used for light emission, and preventing a reduction in a current that flows to the light-emitting element 110 even in a case where a period during which a current is caused to flow to the light-emitting element 110 in digital light control is short.

In addition, the light emission control circuit 100 may receive, from an external microcomputer or the like, the first control signal DDRV and the second control signal GATE that has been adjusted according to the on-duty ratio of the first control signal DDRV, and perform light emission control.

Projection-Type Video Display Device

Next, a projection-type video display device (video projector) according to one embodiment of the invention will be described.

Figure 22:
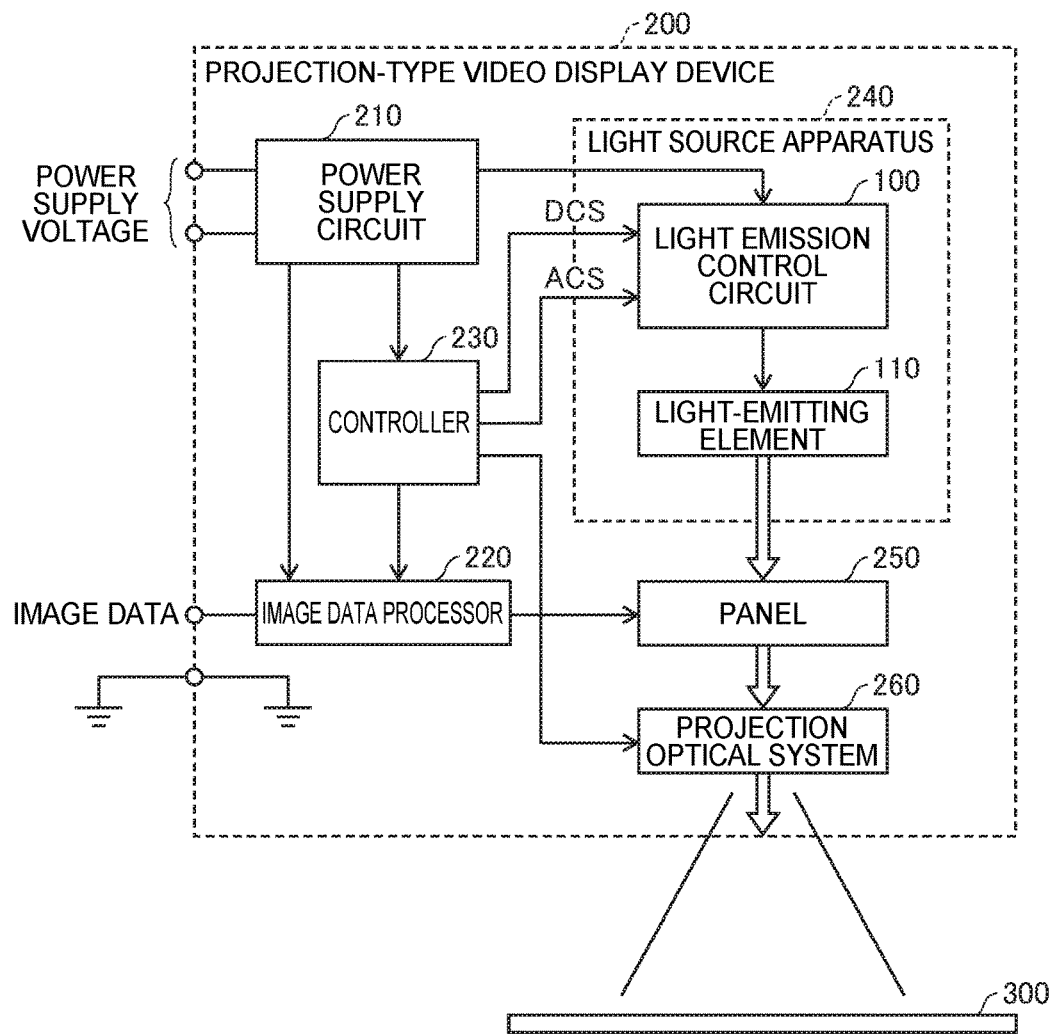
FIG. 22 is a block diagram showing a configuration example of a projection-type video display device according to one embodiment of the invention.

FIG. 22 is a block diagram showing a configuration example of the projection-type video display device according to one embodiment of the invention. A projection-type video display device 200 is a display device to which a power supply voltage is supplied from outside, to which image data is supplied from an image data supply apparatus such as a personal computer or a video player, and that projects an image on a screen (a projection surface) 300 based on the image data.

As shown in FIG. 22, the projection-type video display device 200 includes a power supply circuit 210, an image data processor 220, a controller 230, a light source apparatus 240, a panel 250, and the projection optical system 260. The light source apparatus 240 includes a light emission control circuit 100 and a light-emitting element 110.

The power supply circuit 210 generates a logic power supply voltage based on a power supply voltage of AC 100V supplied from outside, for example, and supplies the logic power supply voltage to the image data processor 220, the controller 230, and the like, and generates a power supply voltage of about DC50V, and supplies the power supply voltage to the light emission control circuit 100 of the light source apparatus 240, and the like. The light emission control circuit 100 generates an internal power supply voltage of about DC30 to 40V based on the power supply voltage of about DC50V, for example.

The image data processor 220 and the controller 230 are constituted by one or more microcomputers and the like, for example. The image data processor 220 processes image data supplied from outside, generates image signals for display and a synchronization signal, supplies the image signals and the synchronization signal to the panel 250, and thereby drives the panel 250 so as to perform image formation.

The controller 230 controls the constituent elements of the projection-type video display device 200 in accordance with an operation performed by an operator using a remote controller or an operation panel (not illustrated). In a case where the operator instructs light control, the controller 230 generates a digital light control signal DCS and an analog light control signal ACS for carrying out light control instructed by the operator, and supplies those signals to the light emission control circuit 100 of the light source apparatus 240.

The light source apparatus 240 emits light with brightness that is based on the digital light control signal DCS and the analog light control signal ACS supplied from the controller 230, and irradiates the panel 250 with the light. For example, in a case where the light-emitting element 110 includes a plurality of laser diodes that generate blue light, the light source apparatus 240 may further include a phosphor that receives the blue light generated by a portion of the laser diodes and generates yellow light, and a spectroscope that separates red light and green light from yellow light in accordance with the wavelength. In that case, the light source apparatus 240 can generate light of three colors, namely, R (red), G (green), and B (blue).

The panel 250 modulates light emitted from the light source apparatus 240, in accordance with image signals and a synchronization signal supplied from the image data processor 220. For example, the panel 250 may include three liquid crystal panels that correspond to the three RGB colors. Each of the liquid crystal panels forms an image by changing the transmissivity of light in a plurality of pixels arranged in matrix. Modulated light modulated by the panel 250 is guided to the projection optical system 260.

The projection optical system 260 includes at least one lens. For example, a projection lens that is a lens group for forming an image by projecting, on the screen 300, modulated light modulated by the panel 250, and various mechanisms that change the state of the diaphragm of the projection lens, the state of the zooming, the shift position, or the like are provided in the projection optical system 260. Those mechanisms are controlled by the controller 230. By the projection optical system 260 projecting modulated light on the screen 300, an image is displayed on the screen 300. According to this embodiment, it is possible to accurately control the luminance of a projected image while reducing the power consumption of the projection-type video display device, using the light source apparatus 240 in which power loss is small and that can accurately control brightness.

The invention is not limited to the embodiments given above, and a person having ordinary skill in the art can make many modifications within the technical concept of the invention. For example, a plurality of embodiments selected from the embodiments given above can be combined and implemented.

This application claims priority from Japanese Patent Application No. 2016-250627 filed in the Japanese Patent Office on Dec. 26, 2016, Japanese Patent Application No. 2017-194874 filed in the Japanese Patent Office on Oct. 5, 2017, and Japanese Patent Application No. 2017-196626 filed in the Japanese Patent Office on Oct. 10, 2017, the entire disclosure of which is hereby incorporated by reference in its entirely.

What is claimed is:

1. A light emission control circuit that controls a first switching element for controlling a current that flows to a light-emitting element connected between a first node and one end of an inductor and a second switching element for controlling a current that flows from the other end of the inductor to a second node, the light emission control circuit comprising:
 a driving circuit that generates a first control signal for controlling the first switching element; and
 a switching control circuit that generates a second control signal for controlling the second switching element, and deactivates the second control signal in order to bring the second switching element into an off-state during at least a portion of a period during which the first control signal is deactivated by the driving circuit in order to bring the first switching element into an off-state.

2. The light emission control circuit according to claim 1, wherein the switching control circuit maintains the second control signal in a deactivated state during a period during which the first control signal is deactivated if an on-duty ratio of the first control signal is larger than or equal to a predetermined value, and maintains the second control signal in an activated state during a portion of the period during which the first control signal is deactivated if the on-duty ratio of the first control signal is smaller than the predetermined value.

3. The light emission control circuit according to claim 2, wherein if the on-duty ratio of the first control signal is smaller than the predetermined value, the switching control circuit maintains the second control signal in an activated state during a predetermined period after the first control signal transits from an activated state to a deactivated state.

4. The light emission control circuit according to claim 3, wherein if the on-duty ratio of the first control signal is smaller than the predetermined value, and the second control signal has never been deactivated during a period during which the first control signal is activated, the switching control circuit maintains the second control signal in an activated state during the predetermined period.

5. The light emission control circuit according to claim 3, wherein if the on-duty ratio of the first control signal is a first value, the switching control circuit sets the predetermined period to a first period, and if the on-duty ratio of the first control signal is a second value that is smaller than the first value, sets the predetermined period to a second period that is longer than the first period.

6. The light emission control circuit according to claim 3, wherein the switching control circuit adjusts the predetermined period according to a current that flows to the light-emitting element.

7. The light emission control circuit according to claim 6, further comprising:
a sample hold circuit that samples and holds a voltage that is in proportion to a current that flows to the light-emitting element when the first control signal is activated.

8. The light emission control circuit according to claim 2, wherein in a case where the on-duty ratio of the first control signal is smaller than the predetermined value, the switching control circuit extends, by a first period, a period during which the second control signal is maintained in an activated state after the first control signal transits from an activated state to a deactivated state if a current that flows to the light-emitting element when the first control signal is activated is smaller than the predetermined value, and shortens, by a second period, the period during which the second control signal is maintained in an activated state after the first control signal transits from an activated state to a deactivated state if a current that flows to the light-emitting element when the first control signal is activated is larger than the predetermined value.

9. The light emission control circuit according to claim 8, wherein the second period is longer than the first period.

10. The light emission control circuit according to claim 2, wherein information regarding the on-duty ratio of the first control signal is received from outside.

11. A light source apparatus comprising:
the light emission control circuit according to claim 1;
the light-emitting element, the inductor, the first and second switching elements;
a capacitor connected between one end of the inductor and a first node; and
a diode connected between the other end of the inductor and the first node,
wherein when the first and second switching elements are in an on-state, a current flows to the light-emitting element and the inductor, and energy is accumulated in the inductor, when the first switching element is in an on-state and the second switching element is in an off-state, a current flows to the light-emitting element and the diode due to energy accumulated in the inductor, and when the first switching element is in an off-state and the second switching element is in an on-state, a current flows to the capacitor and the inductor, and energy is accumulated in the inductor.

12. A projection-type video display device comprising:
the light source apparatus according to claim 11.

13. A light emission control circuit that controls a first switching element for controlling a current that flows to a light-emitting element connected between a first node and one end of an inductor and a second switching element for controlling a current that flows from the other end of the inductor to a second node, the light emission control circuit comprising:
a driving circuit that activates or deactivates a first control signal in order to bring the first switching element into an on-state or an off-state; and
a switching control circuit that activates or deactivates a second control signal in order to bring the second switching element into an on-state or an off-state during a period during which the first control signal is activated, shortens a period during which activation of the second control signal is inhibited in a period during which the first control signal is deactivated, if a current that flows to the light-emitting element when the first control signal is activated is smaller than a predetermined value, and extends the period during which activation of the second control signal is inhibited in the period during which the first control signal is deactivated, if the current that flows to the light-emitting element when the first control signal is activated is larger than the predetermined value.

* * * * *